United States Patent
Xiong et al.

(10) Patent No.: US 10,715,298 B2
(45) Date of Patent: Jul. 14, 2020

(54) ENHANCED RESOURCE MAPPING SCHEME

(71) Applicant: Intel IP Corporation, Santa Clara, CA (US)

(72) Inventors: Gang Xiong, Portland, OR (US); Huaning Niu, San Jose, CA (US); Yushu Zhang, Beijing (CN); Yuan Zhu, Beijing (CN); Jong-Kae Fwu, Sunnyvale, CA (US)

( * ) Notice: Subject to any disclaimer, the term of this patent is extended or adjusted under 35 U.S.C. 154(b) by 0 days.

(21) Appl. No.: 15/764,294

(22) PCT Filed: Mar. 30, 2016

(86) PCT No.: PCT/US2016/025067
§ 371 (c)(1),
(2) Date: Mar. 28, 2018

(87) PCT Pub. No.: WO2017/065826
PCT Pub. Date: Apr. 20, 2017

(65) Prior Publication Data
US 2019/0068352 A1 Feb. 28, 2019

Related U.S. Application Data

(60) Provisional application No. 62/242,938, filed on Oct. 16, 2015.

(51) Int. Cl.
*H04L 5/02* (2006.01)
*H04L 5/00* (2006.01)
(Continued)

(52) U.S. Cl.
CPC .............. *H04L 5/023* (2013.01); *H04L 5/001* (2013.01); *H04L 5/0039* (2013.01);
(Continued)

(58) Field of Classification Search
CPC ..... H04L 5/023; H04L 5/0051; H04L 5/0039; H04L 5/001; H04L 27/2613; H04W 72/042; H04B 7/0452
See application file for complete search history.

(56) References Cited

U.S. PATENT DOCUMENTS

| | | |
|---|---|---|
| 8,824,397 B2 | 9/2014 | Peters |
| 2004/0152415 A1 | 8/2004 | Anagnos |

(Continued)

FOREIGN PATENT DOCUMENTS

| | | |
|---|---|---|
| EP | 2830247 A1 | 1/2015 |
| WO | WO 2014/054908 A1 | 4/2014 |
| WO | WO 2015/021318 A2 | 2/2015 |

OTHER PUBLICATIONS

Catt; "DMRS association issues for E-PDCCH"; 3GPP TSG R1-124765; (Nov. 12-16, 2012); 4 pages; RAN WG1 Meeting #71, New Orleans, USA; Agenda 6.2.3.4.
(Continued)

*Primary Examiner* — Omar J Ghowrwal

(57) ABSTRACT

Technology for an eNodeB to communicate with a user equipment (UE) using an extended control channel within a wireless communication network is disclosed. The eNodeB multiplexes DM-RSs for different antenna ports on an OFDM symbol and transmits the OFDM symbol using an extended PDCCH (xPDCCH).

25 Claims, 20 Drawing Sheets

(51) Int. Cl.
  *H04W 72/04* (2009.01)
  *H04L 27/26* (2006.01)
  *H04B 7/0452* (2017.01)

(52) U.S. Cl.
  CPC ........ *H04L 5/0051* (2013.01); *H04L 27/2613* (2013.01); *H04W 72/042* (2013.01); *H04B 7/0452* (2013.01)

(56) References Cited

U.S. PATENT DOCUMENTS

| | | | |
|---|---|---|---|
| 2013/0040682 | A1 | 2/2013 | Chang et al. |
| 2014/0126499 | A1 | 5/2014 | Li et al. |
| 2014/0133452 | A1* | 5/2014 | Nogami ............ H04W 72/0413 370/329 |
| 2014/0269623 | A1 | 9/2014 | Sadek et al. |
| 2014/0293922 | A1* | 10/2014 | Wang .................. H04W 72/042 370/329 |
| 2014/0307560 | A1 | 10/2014 | Kim et al. |
| 2015/0016379 | A1 | 1/2015 | Nam et al. |
| 2015/0229342 | A1* | 8/2015 | Furuskog .............. H04L 5/0023 370/329 |
| 2015/0296488 | A1* | 10/2015 | Shimezawa ....... H04W 72/0406 370/329 |
| 2015/0304993 | A1* | 10/2015 | Shimezawa ............. H04L 5/001 370/329 |

OTHER PUBLICATIONS

International Preliminary Report on Patentability dated Apr. 17, 2018, in International Application No. PCT/US16/25067, filed Mar. 30, 2016; 7 pages.

* cited by examiner

| RGB Index | xREG | xCCE |
|---|---|---|
| 0 | 0 → 0 | 1 → 1 |
| 1 | 0 → 2 | 1 → 3 |

1100

| RGB Index | xREG $\longrightarrow$ xCCE | |
|---|---|---|
| 0 | 0 $\longrightarrow$ 0 | 1 $\longrightarrow$ 1 |
| 1 | 0 $\longrightarrow$ 2 | 1 $\longrightarrow$ 3 |
| 2 | 0 $\longrightarrow$ 4 | 1 $\longrightarrow$ 5 |
| 3 | 0 $\longrightarrow$ 6 | 1 $\longrightarrow$ 7 |

| RGB Index | xREG $\longrightarrow$ xCCE |
|---|---|
| 0 | 0 $\longrightarrow$ 0 |
| 1 | 0 $\longrightarrow$ 1 |

| RGB Index | xREG $\longrightarrow$ xCCE |
|---|---|
| 0 | 0 $\longrightarrow$ 0 |
| 1 | 0 $\longrightarrow$ 1 |
| 2 | 0 $\longrightarrow$ 2 |
| 3 | 0 $\longrightarrow$ 3 |

FIG. 13

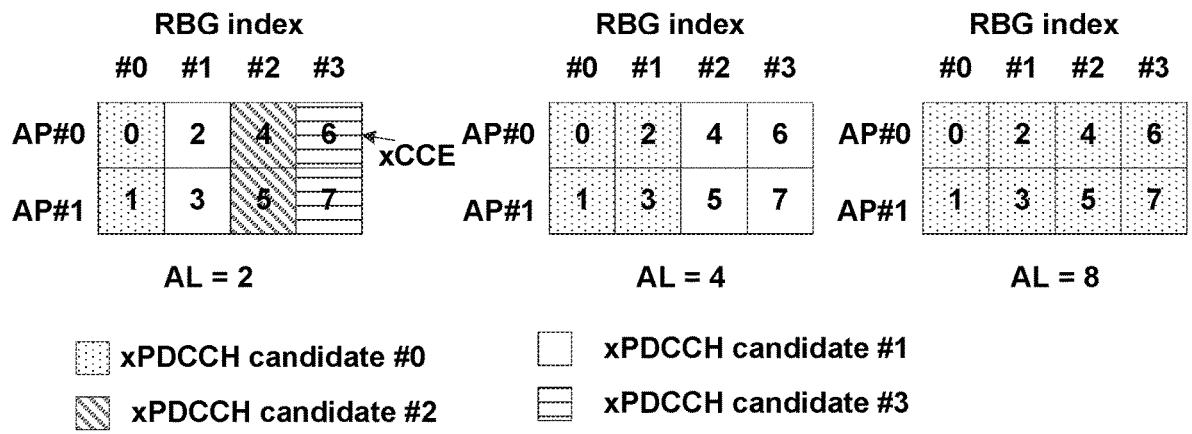
FIG. 14
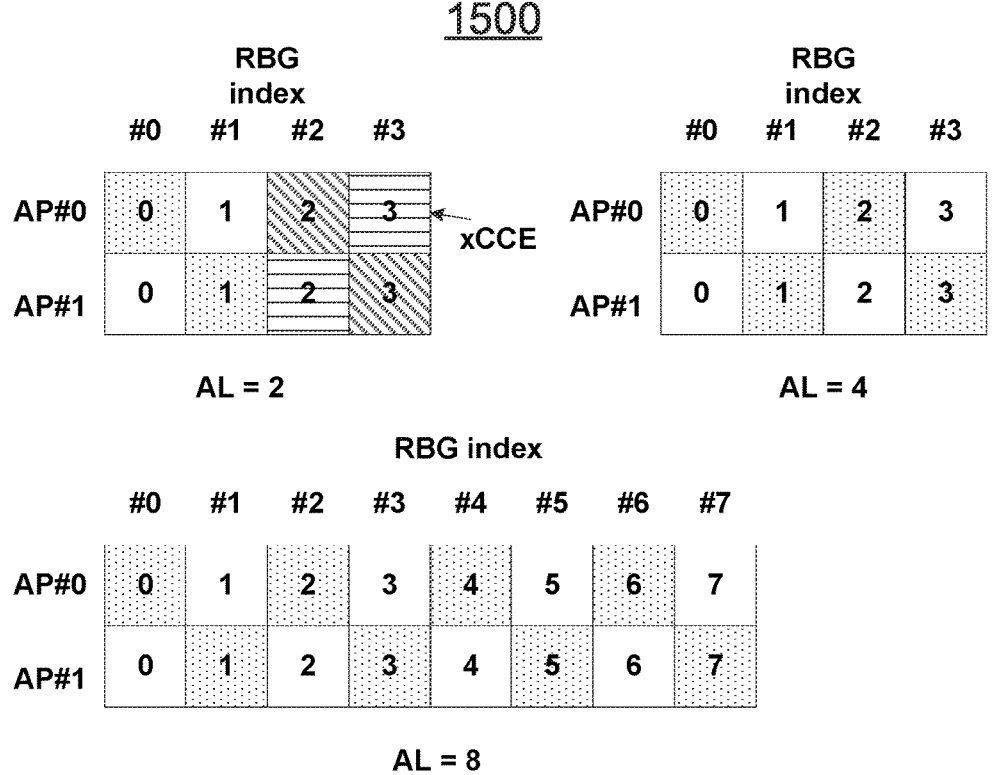
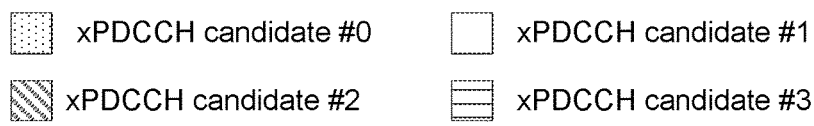
FIG. 15

1700

| Antenna Port (P) | [ $W_P(0)$ $W_P(1)$ $W_P(2)$ $W_P(3)$ ] |
|---|---|
| 0 | [1 1 1 1] |
| 1 | [1 -1 1 -1] |
| 2 | [1 1 -1 -1] |
| 3 | [1 -1 -1 1] |

2000

| RGB Index | xREG → xCCE | | | |
|---|---|---|---|---|
| 0 | 0 → 0 | 1 → 1 | 2 → 4 | 3 → 5 |
| 1 | 0 → 2 | 1 → 3 | 2 → 6 | 3 → 7 |

| RGB Index | xREG → xCCE | | | |
|---|---|---|---|---|
| 0 | 0 → 0 | 1 → 1 | 2 → 8 | 3 → 9 |
| 1 | 0 → 2 | 1 → 3 | 2 → 10 | 3 → 11 |
| 2 | 0 → 4 | 1 → 5 | 2 → 12 | 3 → 13 |
| 3 | 0 → 6 | 1 → 7 | 2 → 14 | 3 → 15 |

| RGB Index | xREG → xCCE | |
|---|---|---|
| 0 | 0 → 0 | 1 → 1 |
| 1 | 0 → 2 | 1 → 3 |

| RGB Index | xREG → xCCE | |
|---|---|---|
| 0 | 0 → 0 | 1 → 1 |
| 1 | 0 → 2 | 1 → 3 |
| 2 | 0 → 4 | 1 → 5 |
| 3 | 0 → 6 | 1 → 7 |

FIG. 23

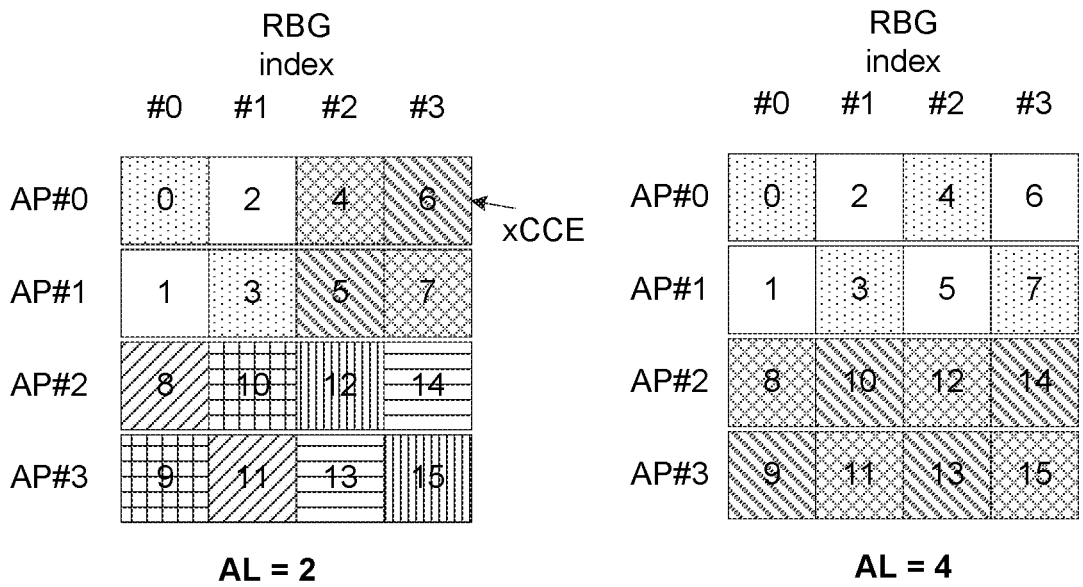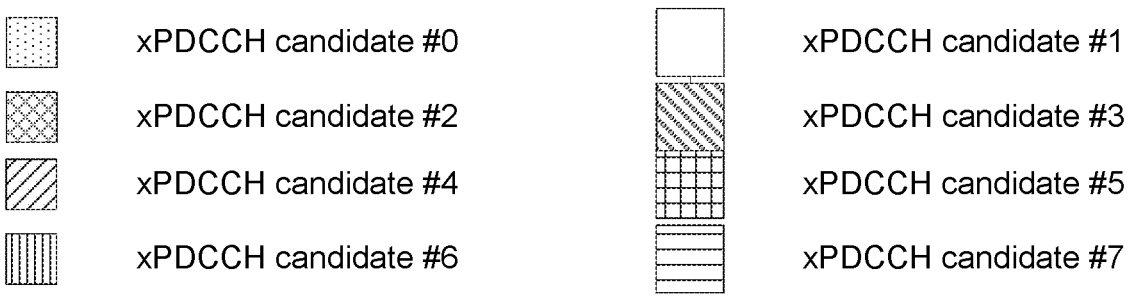
FIG. 25

ENHANCED RESOURCE MAPPING SCHEME

BACKGROUND

Wireless mobile communication technology uses various standards and protocols to transmit data between a node (e.g., a transmission station such as an eNodeB) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3 GPP) long term evolution (LTE), the Institute of Electrical and Electronics Engineers (IEEE) 802.16 standard (e.g., 802.16e, 802.16m), and the IEEE 802.11 standard. In 3 GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node to the wireless device (e.g., UE), and the uplink (UL) transmission can be a communication from the wireless device to the node.

In addition, a wireless multiple-access communications system may include a number of eNodeBs, each simultaneously supporting communication for multiple mobile devices. The eNodeBs may communicate with mobile devices on downstream and upstream links. However, as communication systems increase in sharing of data anywhere and anytime by various users and applications, challenges arise in reducing conflicting performance dimensions and services. Thus, a desire exits for a solution to provide functionality and protocols for diverse multi-dimensional constraints for different services and applications and provide enhanced radio access technologies (RATs) offering seamless wireless connectivity solutions and enable low latency transmission for enhanced mobile broadband communication.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 11 illustrates a table defining the first example of mapping a third generation partnership project (3 GPP) fifth generation (5G) resource element groups (xREG) to 3 GPP 5G control channel elements (xCCE) for four (4) physical resource block groups (RBG) with two antenna ports in accordance with an example;

FIG. 12 illustrates a table defining a second example of mapping a third generation partnership project (3 GPP) fifth generation (5G) resource element groups (xREG) to 3 GPP 5G control channel elements (xCCE) for two (2) physical resource block groups (RBG) with two antenna ports in accordance with an example;

FIG. 13 illustrates a table defining the second example of mapping a third generation partnership project (3 GPP) fifth generation (5G) resource element groups (xREG) to 3 GPP 5G control channel elements (xCCE) for four (4) physical resource block groups (RBG) with two antenna ports in accordance with an example;

FIG. 14 illustrates first example of third generation partnership project (3 GPP) fifth generation (5G) control channel elements (xCCE) to 3 GPP 5G physical downlink (DL) control channel (xPDCCH) candidate mapping for two antenna ports (AP) in accordance with an example;

FIG. 15 illustrates second example of third generation partnership project (3 GPP) fifth generation (5G) control channel elements (xCCE) to 3 GPP 5G physical downlink (DL) control channel (xPDCCH) candidate mapping for two antenna ports (AP) in accordance with an example;

Figure 24:
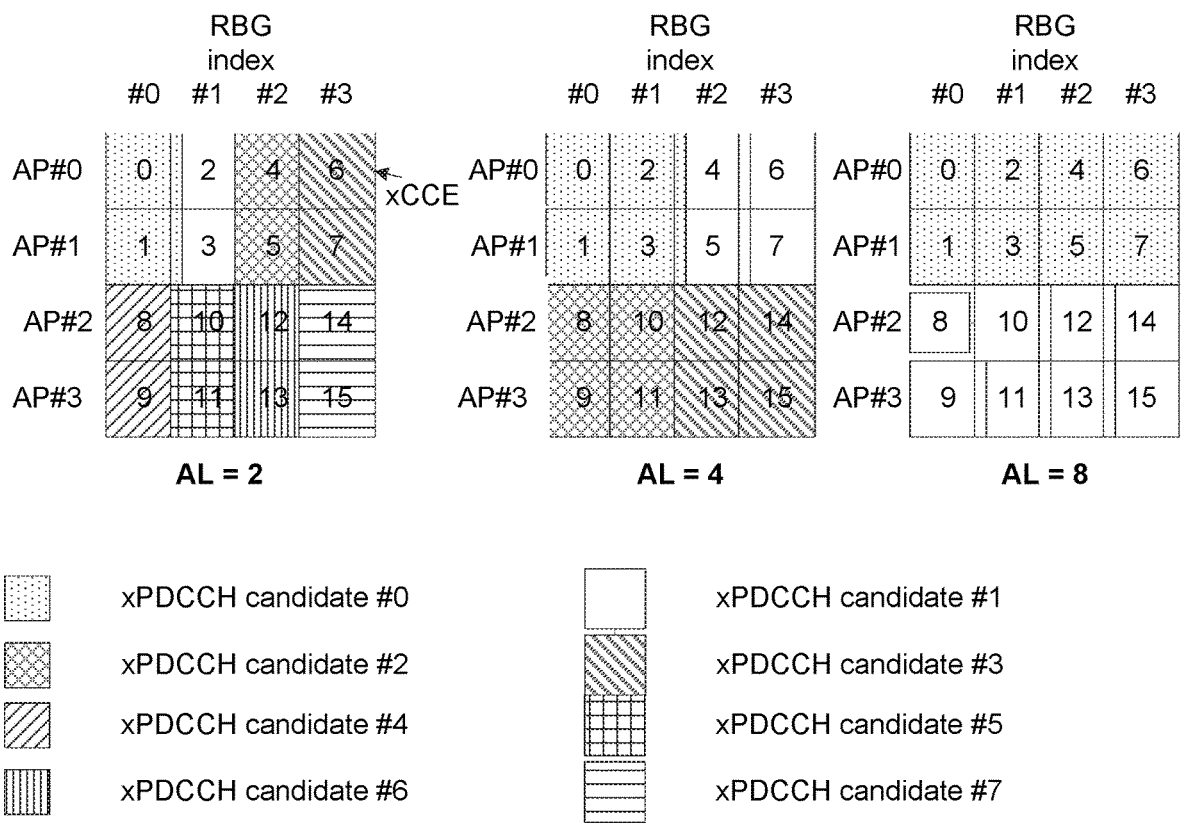
Figure 26:
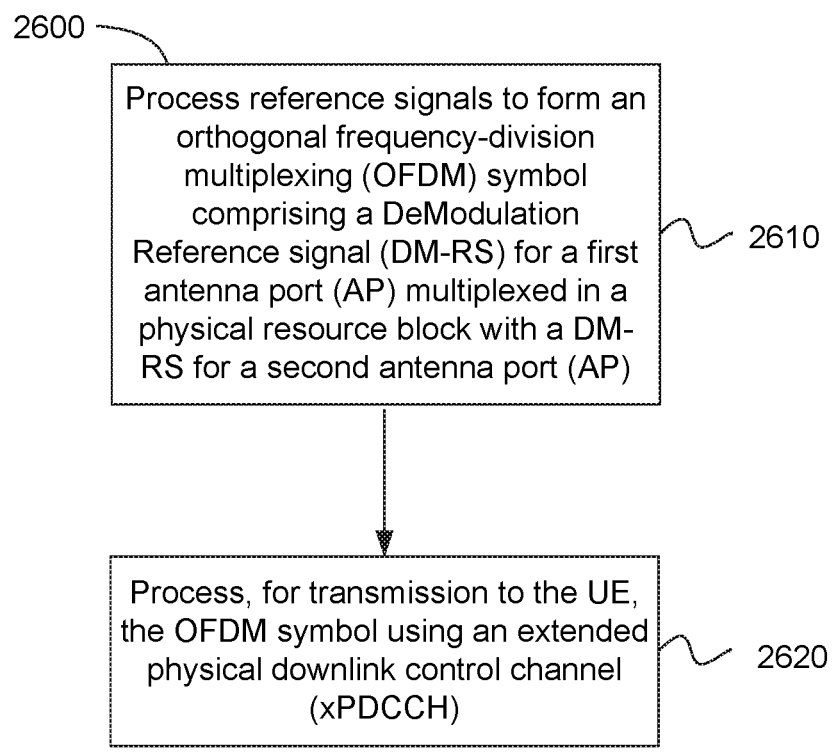
Figure 27:
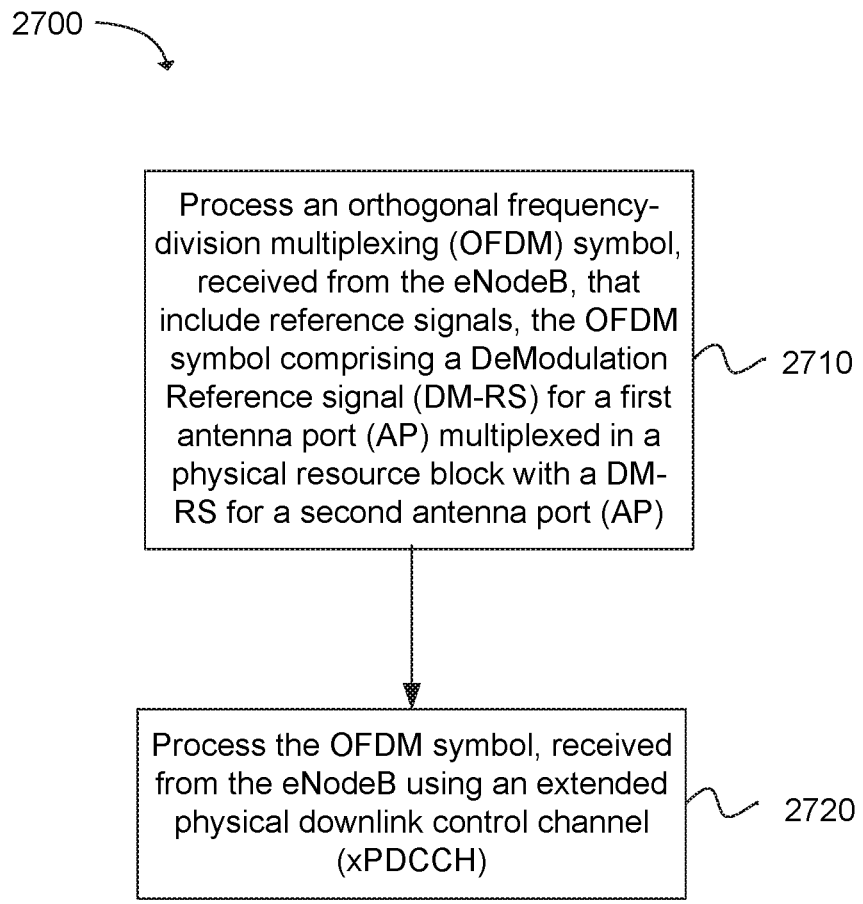
Figure 28:
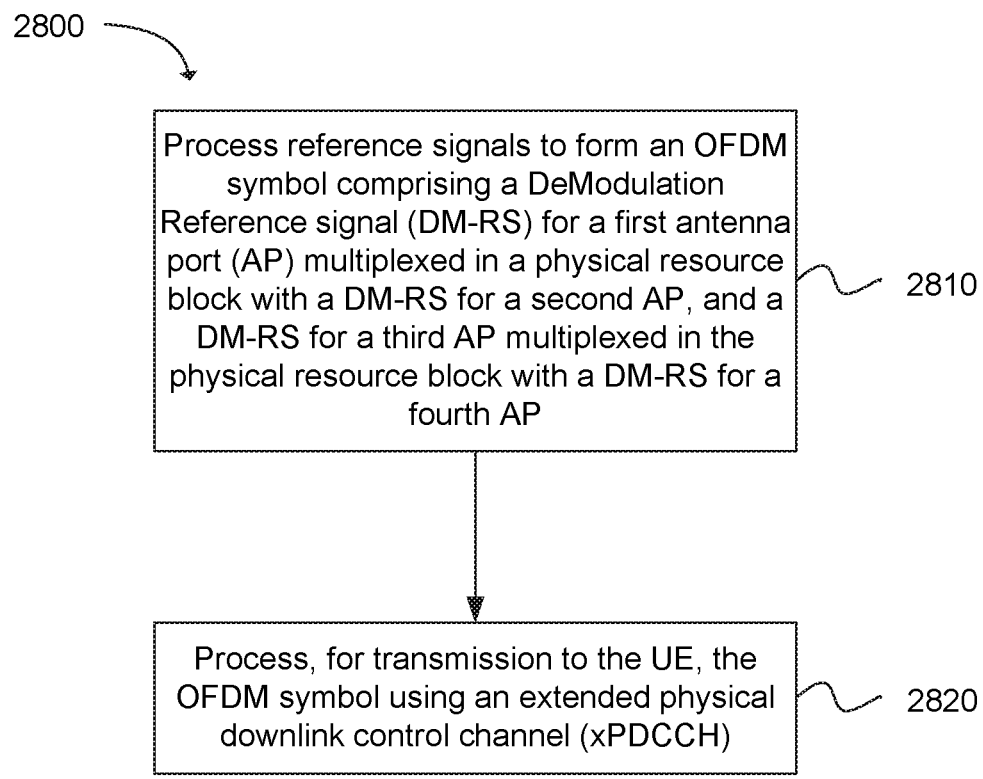
Figure 29:
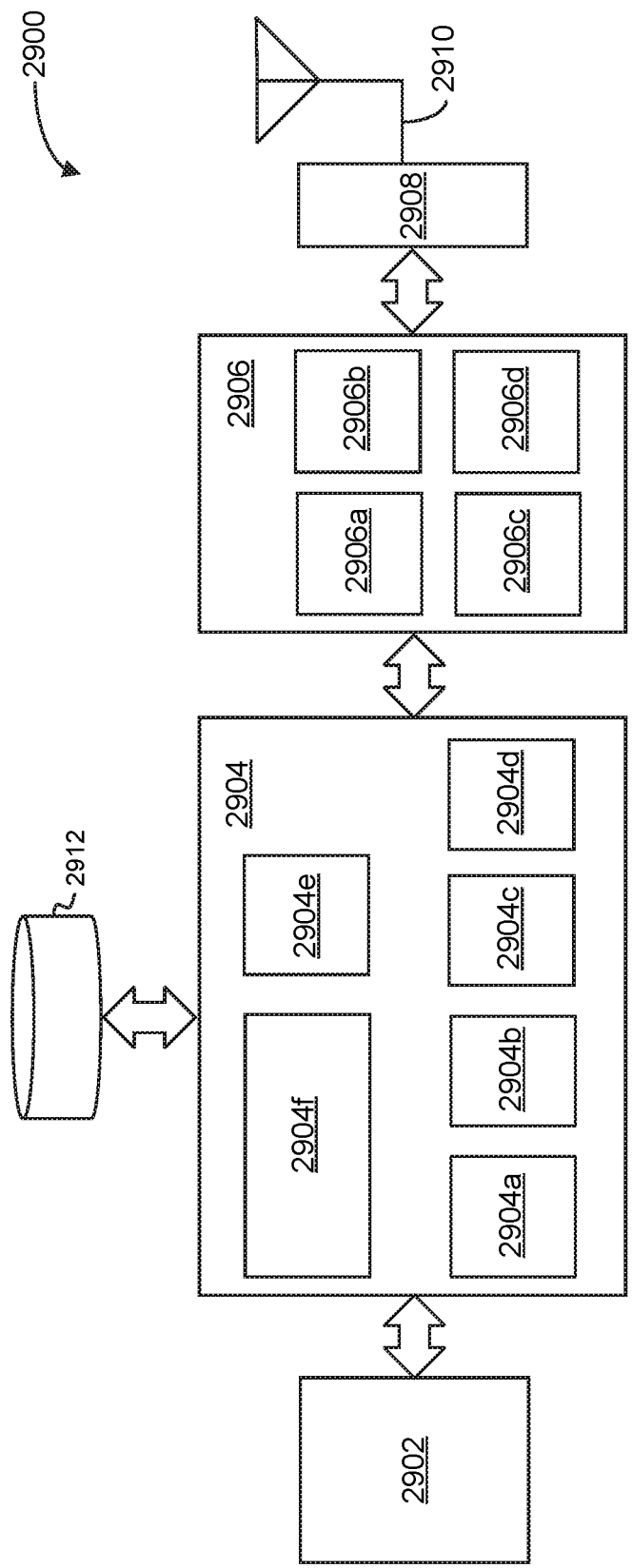
Figure 30:
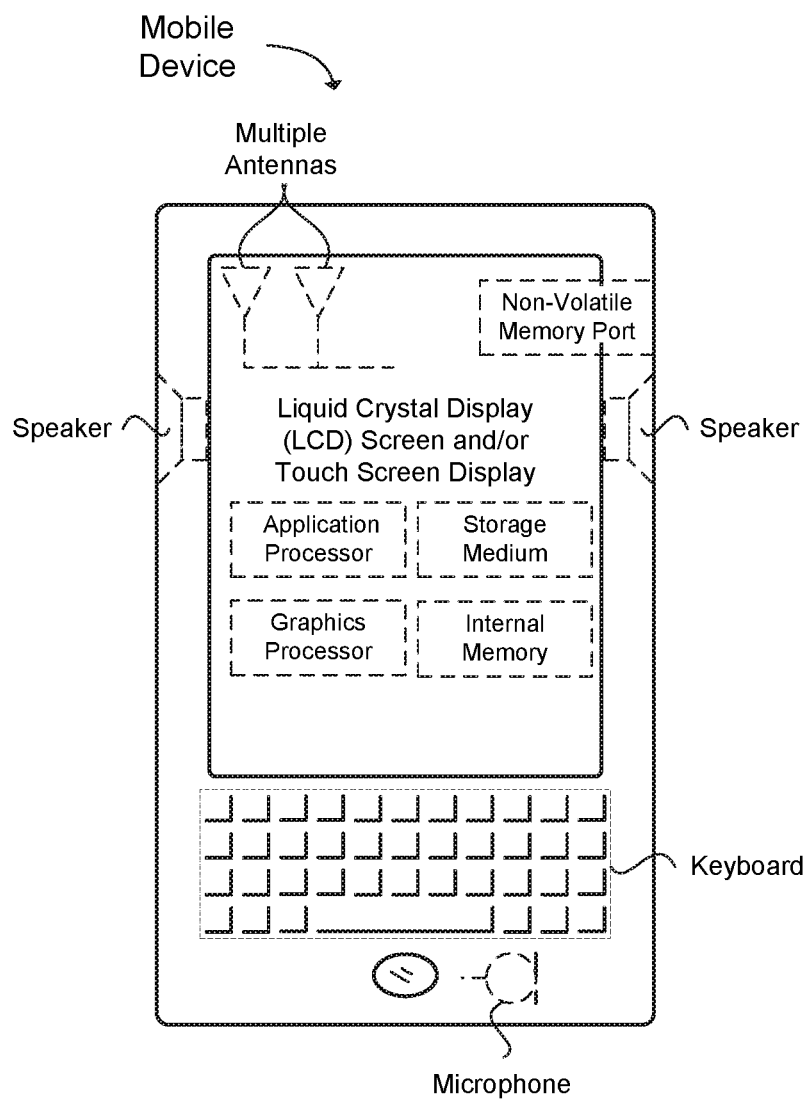
Figure 31:
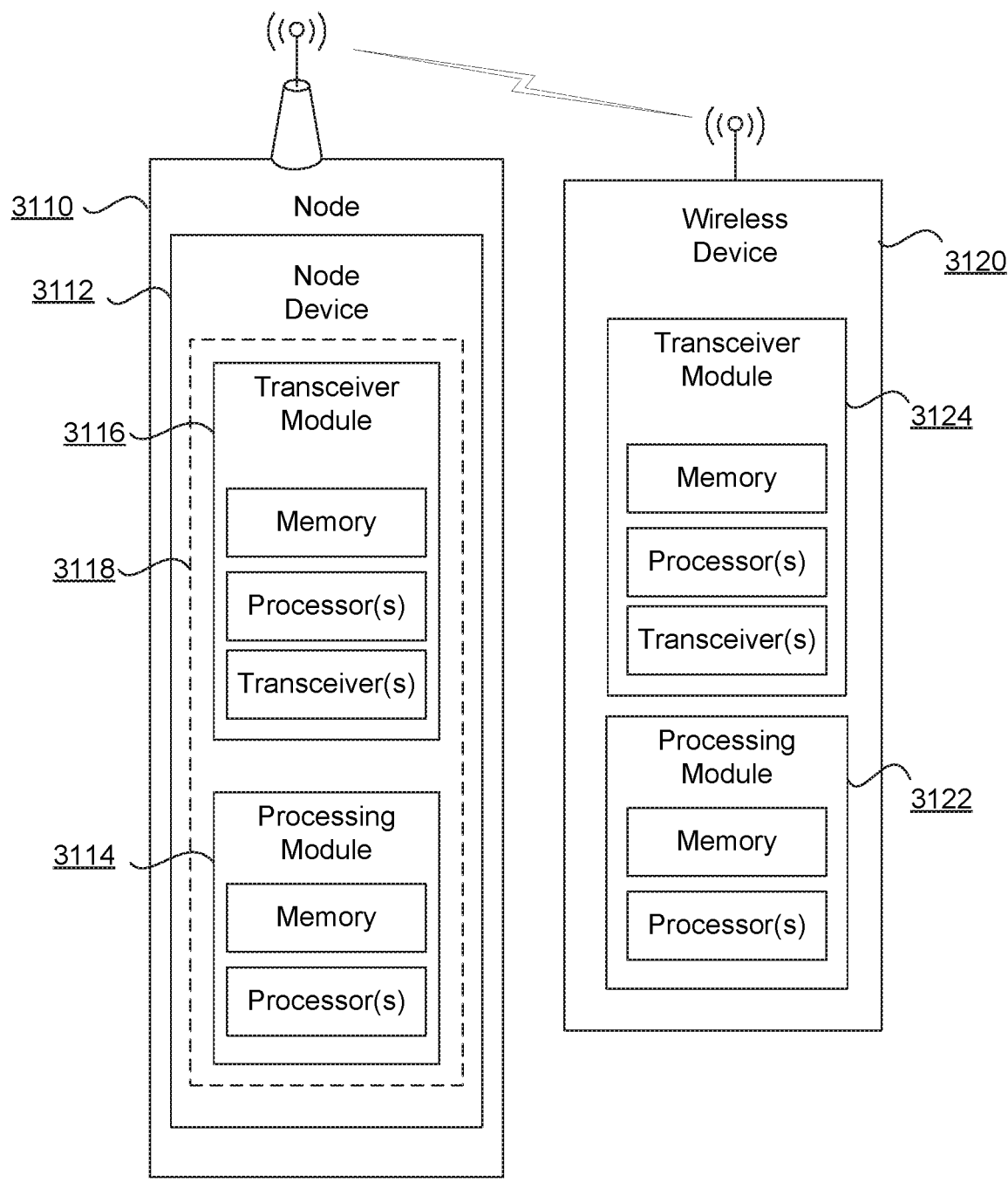

resource element groups (xREG) to resource elements (RE) for four (4) antenna ports (AP) in accordance with an example;

FIG. 20 illustrates a table defining a first example of mapping a third generation partnership project (3 GPP) fifth generation (5G) resource element groups (xREG) to 3 GPP 5G control channel elements (xCCE) for two (2) physical resource block groups (RBG) with four antenna ports (AP) in accordance with an example;

FIG. 21 illustrates a table defining the first example of mapping a third generation partnership project (3 GPP) fifth generation (5G) resource element groups (xREG) to 3 GPP 5G control channel elements (xCCE) for four (4) physical resource block groups (RBG) with four antenna ports in accordance with an example;

FIG. 22 illustrates a table defining a second example of mapping a third generation partnership project (3 GPP) fifth generation (5G) resource element groups (xREG) to 3 GPP 5G control channel elements (xCCE) for two (2) physical resource block groups (RBG) with four antenna ports (AP) in accordance with an example;

FIG. 23 illustrates a table defining the second example of mapping a third generation partnership project (3 GPP) fifth generation (5G) resource element groups (xREG) to 3 GPP 5G control channel elements (xCCE) for three (3) physical resource block groups (RBG) with four antenna ports in accordance with an example;

FIG. 24 illustrates first example of third generation partnership project (3 GPP) fifth generation (5G) control channel elements (xCCE) to 3 GPP 5G physical downlink (DL) control channel (xPDCCH) candidate mapping for four antenna ports (AP) in accordance with an example;

FIG. 25 illustrates a second example of third generation partnership project (3 GPP) fifth generation (5G) control channel elements (xCCE) to 3 GPP 5G physical downlink (DL) control channel (xPDCCH) candidate mapping for four antenna ports (AP) in accordance with an example;

FIG. 26 depicts additional functionality of an eNodeB to communicate with a user equipment (UE) using a third generation partnership project (3 GPP) fifth generation (5G) control channel within a wireless communication network in accordance with an example;

FIG. 27 depicts functionality of a user equipment (UE) to communicate with an eNodeB using a third generation partnership project (3 GPP) fifth generation (5G) control channel within a wireless communication network in accordance with an example;

FIG. 28 depicts additional functionality of an eNodeB to communicate with a user equipment (UE) using a third generation partnership project (3 GPP) fifth generation (5G) control channel in accordance with an example;

FIG. 29 illustrates a diagram of example components of a User Equipment (UE) device in accordance with an example; and FIG. 30 illustrates a diagram of example components of a wireless device (e.g. User Equipment "UE") device in accordance with an example;

FIG. 31 illustrates a diagram of a node (e.g., eNB) and wireless device (e.g., UE) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. Third generation partnership project (3 GPP) next generation wireless communication system, fifth generation "5G", can provide access to information and sharing of data anywhere, anytime by various users and applications. In one aspect, 3 GPP 5G can be a unified network/system targeted to meet vastly different, and often times conflicting, performance dimensions and services. Such diverse multi-dimensional constraints can be driven by different services and applications. In one aspect, 5G can evolve based on 3 GPP long term evolution (LTE)-Advanced (Adv.) ("3 GPP LTE-Adv.") with additional new Radio Access Technologies (RATs) providing a user with an enriched experience with simple and seamless wireless connectivity solutions. In one aspect, 5G can enable delivering fast, efficient and optimized content and services for everything connected within a wireless network.

Accordingly, the present technology provides for an eNodeB to communicate with a user equipment (UE) using a third generation partnership project (3 GPP) fifth generation (5G) control channel within a wireless communication network. The eNodeB can identify one or more parameters of a third generation partnership project (3 GPP) fifth generation (5G) physical downlink (DL) control channel (xPDCCH), also referred to as an extended PDCCH. The eNodeB can process, for transmission to the UE, one or more messages on the xPDCCH according to the one or more parameters.

In one aspect, the present technology provides for a user equipment (UE) to communicate with an eNodeB using an extended physical downlink control channel within a wireless communication network. The UE can process one or more messages using an xPDCCH in accordance with one or more parameters, identified by the eNodeB, based on configured resources. The UE can process, for transmission to the eNodeB, the one or more messages on the xPDCCH according to the one or more parameters.

In one aspect, the present technology provides for an eNodeB to communicate with a user equipment (UE) using a third generation partnership project (3 GPP) fifth generation (5G) control channel within a wireless communication network. The eNodeB can identify one or more parameters of a third generation partnership project (3 GPP) fifth generation (5G) physical downlink (DL) control channel (xPDCCH). The eNodeB can process, for transmission to the UE, one or more messages on the xPDCCH according to the one or more parameters, wherein one or more antenna ports (AP) for used for the xPDCCH.

In one aspect, the present technology provides for a resource mapping scheme for an extended control channel design. In particular, the present technology provides a Demodulation Reference Signal (DM-RS) pattern for xPDCCH transmission, extended resource element groups (xREG) to resource element (RE) mapping, extended control channel element (xCCE) to xREG mapping, and/or xCCE to xPDCCH candidate mapping.

Figure 1:
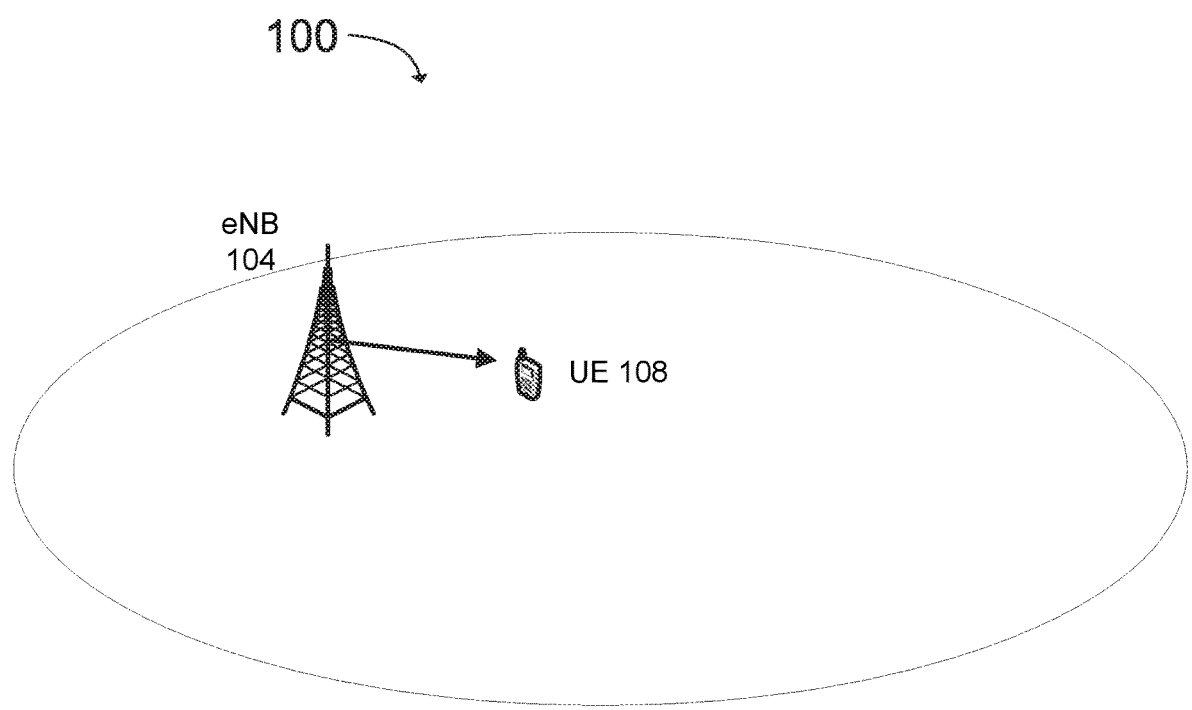
FIG. 1 illustrates a mobile communication network within a cell in accordance with an example.

FIG. 1 illustrates a mobile communication network within a cell 100 having an evolved node B (eNB or eNodeB) with a mobile device. FIG. 1 illustrates an eNB 104 that can be associated with an anchor cell, macro cell or primary cell. Also, the cell 100 can include a mobile device, such as, for example, a User Equipment (UE or UEs) 108 that can be in communication with the eNB 104. The eNB 104 can be a station that communicates with the UE 108 and can also be referred to as a base station, a node B, an access point, and the like. In one example, the eNB 104 can be a high transmission power eNB, such as a macro eNB, for coverage and connectivity. The eNB 104 can be responsible for mobility and can also be responsible for radio resource control (RRC) signaling. The UE or UEs 108 can be supported by the macro eNB 104. The eNB 104 can provide communication coverage for a particular geographic area. In 3 GPP, the term "cell" can refer to a particular geographic coverage area of eNB and/or an eNB subsystem serving the coverage area with an associated carrier frequency and a frequency bandwidth, depending on the context in which the term is used.

Figure 2:
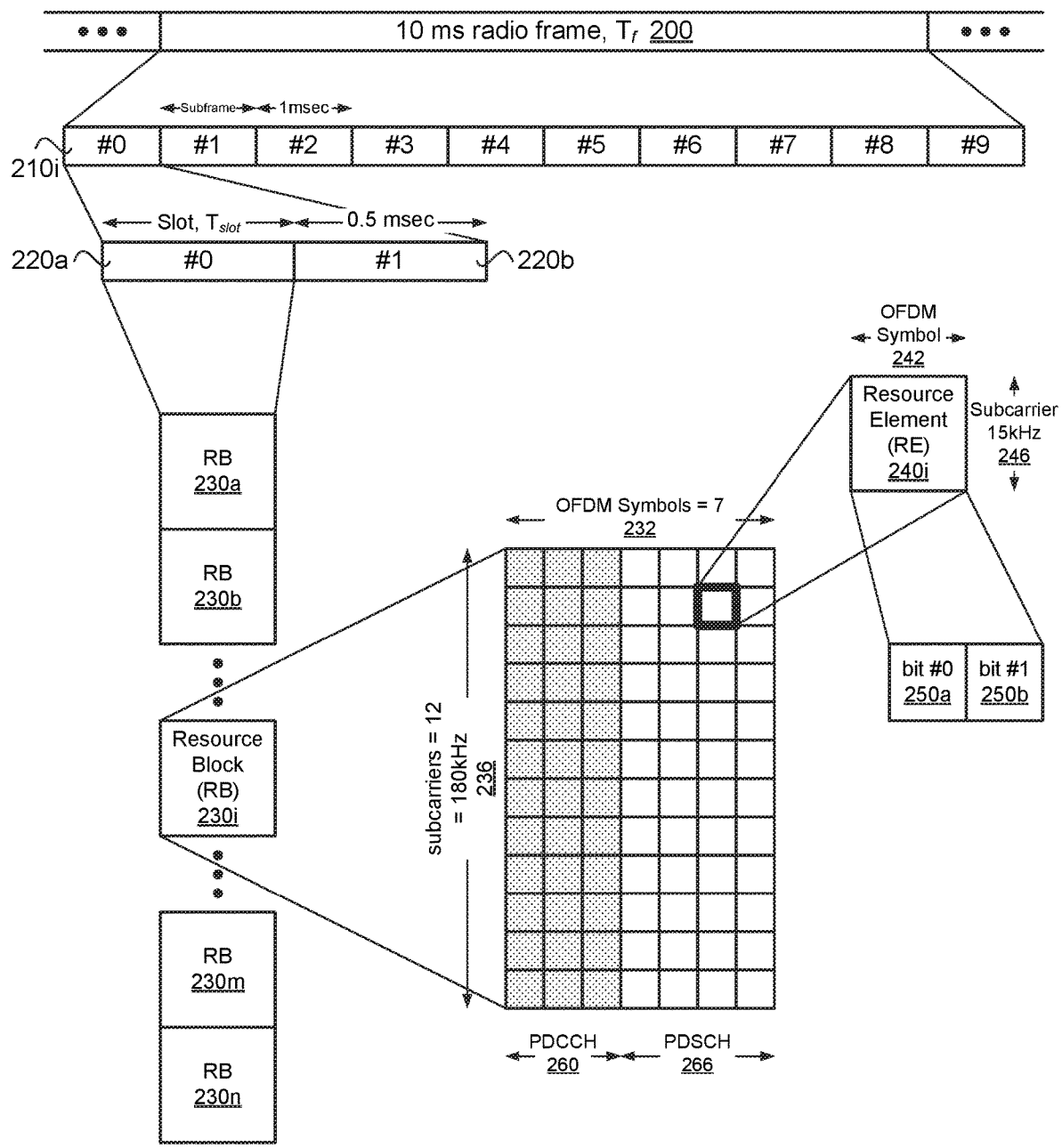
FIG. 2 illustrates a diagram of radio frame resources (e.g., a resource grid) for a downlink (DL) transmission including a physical downlink control channel (PDCCH) in accordance with an example.

FIG. 2 illustrates a diagram of radio frame resources (e.g., a resource grid) for a downlink (DL) transmission including a physical downlink control channel (PDCCH) in accordance with an example. In the example, a radio frame 200 of a signal used to transmit the data can be configured to have a duration, Tf, of 10 milliseconds (ms). Each radio frame can be segmented or divided into ten subframes 210i that are each 1 ms long. Each subframe can be further subdivided into two slots 220a and 220b, each with a duration, Tslot, of 0.5 ms. In one example, the first slot (#0) 220a can include a physical downlink control channel (PDCCH) 260 and/or a physical downlink shared channel (PDSCH) 266, and the second slot (#1) 220b can include data transmitted using the PDSCH.

Each slot for a component carrier (CC) used by the node and the wireless device can include multiple resource blocks (RBs) 230a, 230b, 230i, 230m, and 230n based on the CC frequency bandwidth. The CC can include a frequency bandwidth and a center frequency within the frequency bandwidth. In one example, a subframe of the CC can include downlink control information (DCI) found in the PDCCH. The PDCCH in the control region can include one to three columns of the first OFDM signals in a subframe or physical RB (PRB), when a legacy PDCCH is used. The remaining 11 to 13 OFDM symbols (or 14 OFDM symbols, when legacy PDCCH is not used) in the subframe can be allocated to the PDSCH for data (for short or normal cyclic prefix). For example, as used herein, the term 'slot' may be used for 'subframe', or 'transmission time interval (TTI)' can be used for 'frame' or 'frame duration'. In addition, a frame may be considered a user transmission specific quantity (such as a TTI associated with a user and a data flow).

Each RB (physical RB or PRB) 230i can include 12 subcarriers 236 of 15 kHz subcarrier spacing, for a total of 180 kHz (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 240i using short or normal cyclic prefixing, or the resource block can be mapped to 72 REs (not shown) using extended cyclic prefixing. The RE can be a unit of one OFDM symbol 242 by one subcarrier (i.e., 15 kHz) 246.

Each RE can transmit two bits 250a and 250b of information in the case of quadrature phase-shift keying (QPSK) modulation. Other types of modulation can be used, such as 16 quadrature amplitude modulation (QAM), to transmit 4 bits per RE, or 64 QAM to transmit 6 bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

However, in existing LTE specification, a longer Hybrid automatic repeat request (HARQ) acknowledgement (HARQ-ACK) transmission latency (e.g. such as equal to or greater than 7 subframes) can be expected for certain downlink (DL) and uplink (UL) configurations for Time-Division Duplex (TDD) system compared to a frequency division duplex (FDD) system. The longer HARQ-ACK transmission latency can be primarily due to the fact that the DL or UL subframe may not be available at the time for HARQ-ACK transmission. Thus, in one aspect, in order to reduce the latency for HARQ-ACK transmission, UL control channel can be inserted in one or more subframes within one frame. This flexible duplex TDD structure can also help to enable subframe-level fast DL/UL traffic adaptation to increase the spectrum efficiency.

Moreover, in one aspect, to further reduce the HARQ-ACK transmission latency, HARQ ACK/NACK feedback can be transmitted in the same subframe when a 3 GPP 5G physical downlink shared channel (xPDSCH) is scheduled.

Figure 3:
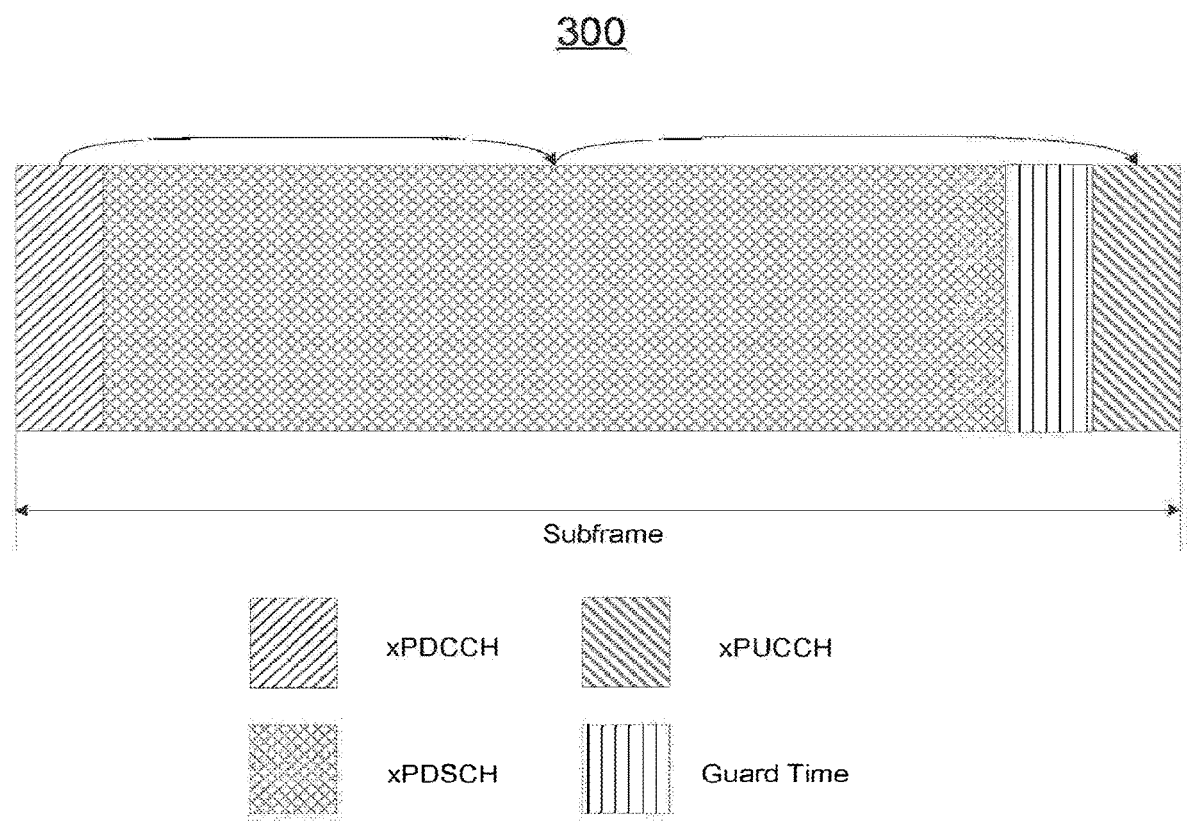
FIG. 3 illustrates a downlink (DL) self-contained time division duplex (TDD) subframe in accordance with an example.

Turning now to FIG. 3, an enhanced 3 GPP 5G downlink (DL) self-contained time division duplex (TDD) subframe 300 is depicted. That is, FIG. 3. illustrates the self-contained TDD subframe structure 300 in the DL. In particular, the xPDSCH can be scheduled by a 5G physical downlink control channel (xPDCCH) and can be transmitted immediately after the xPDCCH. Following the decoding of the xPDSCH, one or more UEs can feedback the ACK or negative acknowledgment (NACK) in a 3 GPP 5G physical uplink control channel (xPUCCH) in a selected section of the subframe, such as in the last section (e.g., a section designated as the last section, such as a last section to be transmitted) of the subframe. In one aspect, a guard time (GT) can be inserted between the xPDSCH and the xPUCCH in order to accommodate the DL-to-UL and/or UL-to-DL switching time and round-trip propagation delay.

It should be note that in existing 3 GPP long term evolution (LTE) specifications, a physical downlink control channel (PDCCH) spans up to 3 orthogonal frequency-division multiplexing (OFDM) symbols (or 4 OFDM symbols if the system bandwidth is 1.4 mega hertz "MHz") at the start of a subframe. Multiple PDCCHs can be transmitted in the downlink (DL) control region of a subframe. Given that PDCCH can only occupy up to 3 or 4 OFDM symbols in a subframe, a limited number of Downlink Control Information (DCI) messages can be transmitted per subframe, which may limit the capacity of control channel.

Figure 4:
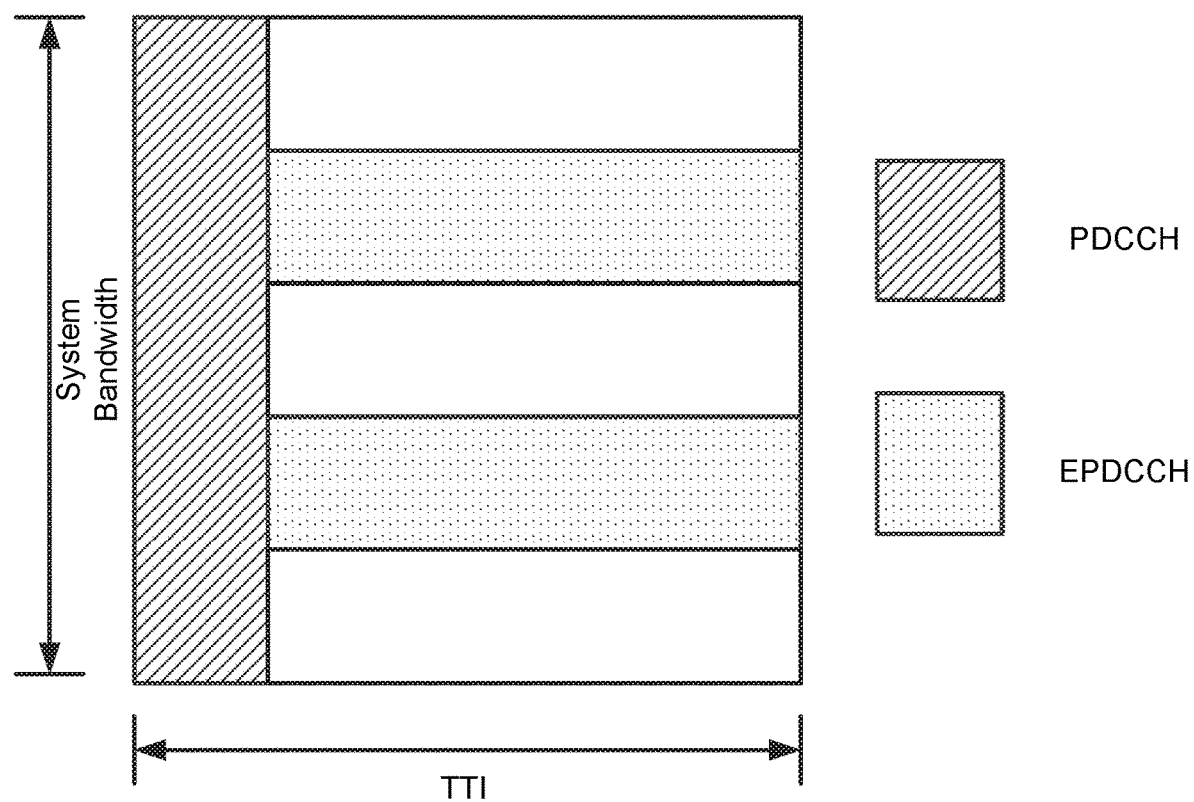
FIG. 4 illustrates a physical downlink control channel (PDCCH) and an enhanced physical downlink control channel (EPDCCH) in accordance with an example.

To overcome the limitation of the legacy PDCCHs, 3 GPP release 11 (Rel. 11) LTE introduced an enhanced physical downlink control channel (EPDCCH) to increase the control channel capacity. In order to coexist on the same carrier with a legacy UE without interfering with the legacy control channels, an EPDCCH can be transmitted after the legacy PDCCH control region. Further, EPDCCH and PDSCH can be multiplexed in a frequency-division multiplexing (FDM) manner to minimize the interference to data channel transmission. The FDM based multiplexing scheme can also allow frequency selective scheduling based on the channel state information feedback from UE, thereby leading to superior performance for EPDCCH. FIG. 4 illustrates the PDCCH and EPDCCH design 400 in 3 GPP LTE Rel. 11. FIG. 4 shows the system bandwidth on the horizontal axis and transmission time interval (TTI) on the vertical axis. As indicated in FIG. 4, the PDCCH can span the first 3 or 4 OFDM symbols and can occupy the full system bandwidth, while the EPDCCH can span the remaining OFDM symbols after the legacy PDCCH region. The EPDCCH can be configured to occupy a few PRBs, depending on the configuration.

To improve and increase the efficiency of 3 GPP LTE Rel. 11, the present technology, in one embodiment, provides for a resource mapping scheme for a 3 GPP 5G, extended control channel design. In particular, the present technology provides for a Demodulation Reference signal (DMRS) pattern for xPDCCH transmission, extended resource element groups (xREG) to resource element (RE) mapping, extended control channel element (xCCE) to xREG mapping, and/or xCCE to xPDCCH candidate mapping.

Figures 5, 6:
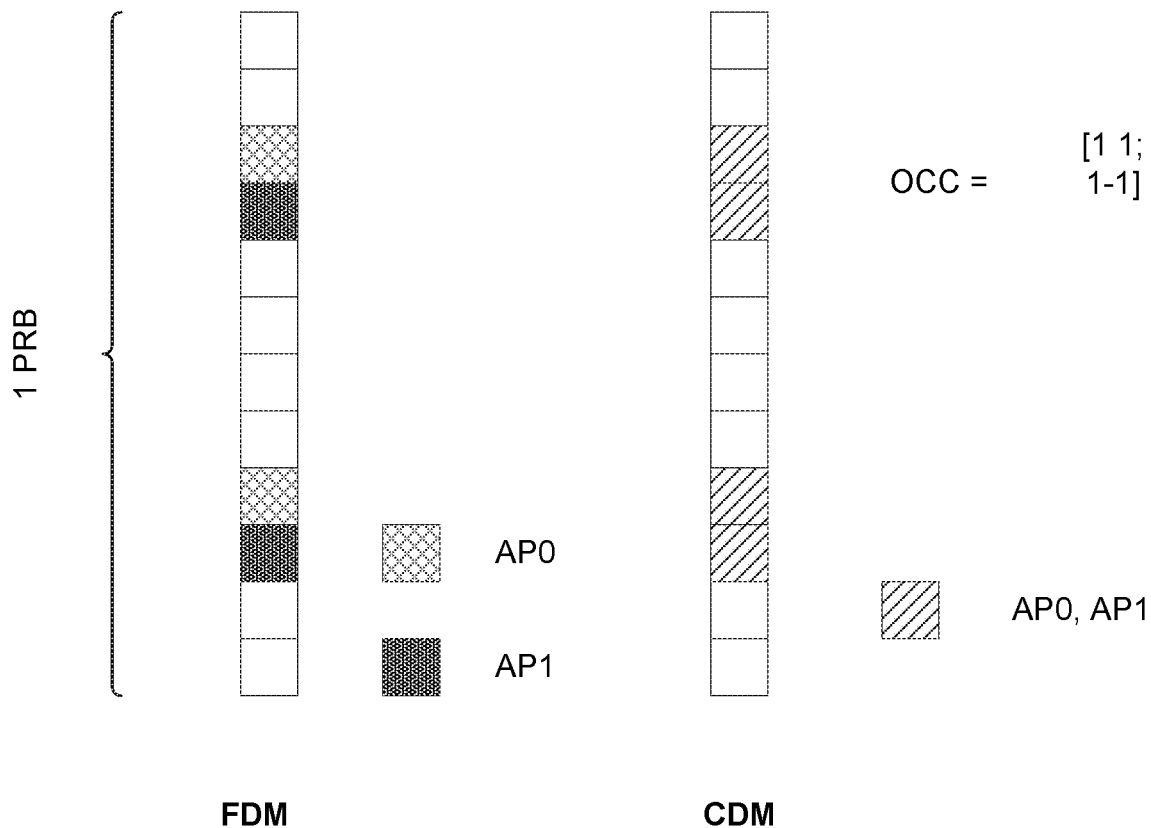
FIG. 5 illustrates DeModulation Reference Signal (DMRS) patterns for a third generation partnership project (3 GPP) fifth generation (5G) physical downlink (DL) control channel (xPDCCH) for two antenna ports in accordance with an example.
FIG. 6 illustrates a table defining orthogonal cover codes (OCC) for two antenna ports in accordance with an example.

Turning now to FIG. 5, DeModulation Reference signal (DMRS) patterns 500 for a third generation partnership project (3 GPP) fifth generation (5G) extended physical downlink (DL) control channel (xPDCCH) for two antenna ports are depicted. That is, FIG. 5 illustrates DMRS patterns 500 within one OFDM symbol. In this example embodiment, for the xPDCCH transmission, two antenna ports (AP) can be defined within one symbol. Further, the DMRS for the two APs can be multiplexed in a Frequency-division multiplexing (FDM) or Code Division Multiplexing (CDM) manner. For CDM multiplexing between two APs, an orthogonal cover code (OCC) may be applied on each AP. The OCC can be defined as illustrated in table 600 of FIG. 6. The table 600 illustrates orthogonal cover codes (OCC) for two antenna ports. The OCC can be based on a length-2 Walsh-Hadamard code. The orthogonal sequences can be represented as [$W_p(o) \ldots W_p(1)$], where "P" is the antenna port, such as, for example, P0 can be a first antenna port and P1 can be a second antenna port. OCC can be applied on top of the DM-RS. That is, AP0 and AP1 can use length-2 OCC [1,1] and [1,−1], as depicted in FIG. 6. Each OCC can be associate with each AP, such as AP0 being associated with OCC [1, 1], and AP1 being associate with OCC [1, −1].

Figure 7:
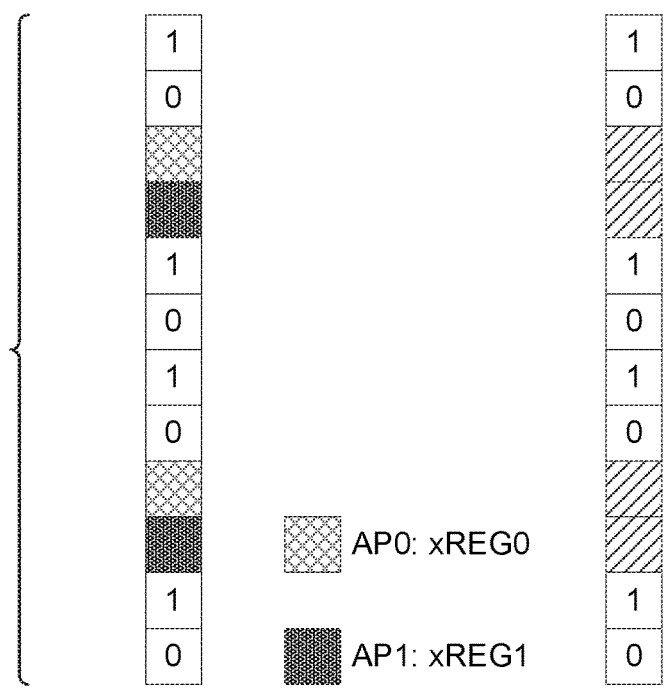
FIG. 7 illustrates a first example of mapping a third generation partnership project (3 GPP) fifth generation (5G) resource element groups (xREG) to resource elements (RE) in accordance with an example.

According to the DMRS pattern of various embodiments, extended resource element groups (xREG) can be defined as follows. In a first option (e.g., "Option 1"), two resource element groups (REGs) can be defined as: xREG0 and xREG1, with each xREG associated with one antenna port, such as AP0 and AP1. For example, xREG0 can be associated with AP0 and xREG1 can be associated with AP1. Within one physical resource block (PRB), one xREG can occupy 4 resource elements (RE). The mapping from xREG to RE is illustrated in the example of FIG. 7. In FIG. 7, 0 can indicate the xREG 0 and 1 can indicate xREG 1.

Figure 8:
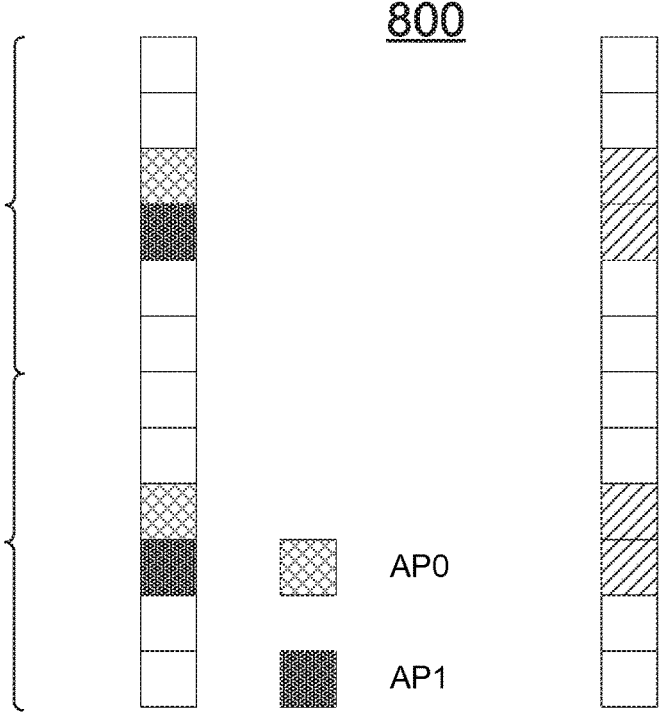
FIG. 8 illustrates a second example of mapping a third generation partnership project (3 GPP) fifth generation (5G) resource element groups (xREG) to resource elements (RE) in accordance with an example.

In a second option ("Option 2"), one xREG can be defined for xPDCCH transmission. Each xREG can occupy 4 REs which can indicate that 1 physical resource block (PRB) can have 2 xREGs, as depicted in FIG. 8. The design of Option 2 can be used to support Multiple User-Multiple Input Multiple Output (MU-MIMO).

Moreover, in one aspect, K contiguous xREGs can form one 3extended control channel element (xCCE), where "K" can be defined as a positive integer. Thus, in one aspect, for Option 1, K can be equal to 8 (e.g., K=8), which can indicate that one xCCE (e.g., xCCE #0 or xCCE #1) can have 32 REs and can span 8 PRBs in the frequency domain.

In an alternative aspect, for Option 2, K can equal 4 (e.g., "K=4"), which can indicate one xCCE can have 16 REs and can span 4 PRBs in the frequency domain. In one aspect, K contiguous PRBs can be defined as one PRB group (RBG) for the xPDCCH transmission. The number of PRBs within system bandwidth can be calculated as:

$$N_{RGB} = \left[\frac{N_{PGB}}{K}\right], \quad (1)$$

where $N_{PRB}$ is the number of PRB in the system bandwidth. An RBG index within one system bandwidth can be labeled as 0, 1, ..., $N_{RPB}$−1. In one aspect, a UE can be configured with up to $N_{Set}$ xPDCCH sets. In one aspect, $N_{Set}$=2, which can indicate that one UE can be configured with up to 2 xPDCCH sets. Each xPDCCH set can include M RBGs, where M is a positive integer. The number of RBGs can be different in different xPDCCH sets. In addition, one or more RBGs can be partially and/or fully overlapped and/or non-overlapped between multiple xPDCCH sets. The xPDCCH set can be localized or distributed. In the localized case, frequency dependent scheduling gain may be achieved when channel state information is available at the eNB. In the distributed case, frequency diversity gain may be achieved, which is desirable for open loop scheduling. The configuration of the xPDCCH transmission, including the xPDCCH set and the selection of a localized or distributed mode, can be signaled by higher layers via an extended master information block (xMIB), an extended system information block (xSIB), and/or a UE specific dedicated RRC signalling.

Figures 9, 10:
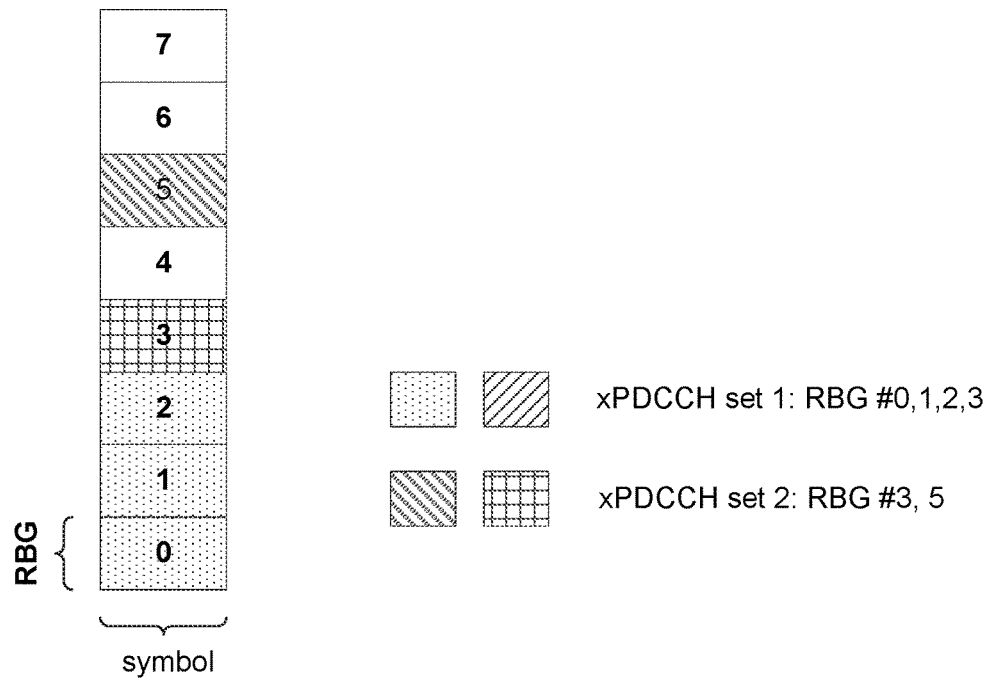
FIG. 9 illustrates a third generation partnership project (3 GPP) fifth generation (5G) physical downlink (DL) control channel (xPDCCH) set configuration in accordance with an example.
FIG. 10 illustrates a table defining a first example of mapping a third generation partnership project (3 GPP) fifth generation (5G) resource element groups (xREG) to 3 GPP 5G control channel elements (xCCE) for two (2) physical resource block groups (RBG) with two antenna ports in accordance with an example.

Turning now to FIG. 9, an) extended physical downlink (DL) control channel (xPDCCH) set configuration (e.g., a 3 GPP LTE 5G physical downlink (DL) control channel (xPDCCH) set configuration) is depicted. That is, FIG. 9 illustrates one example of an xPDCCH set configuration 900. In FIG. 9, two xPDCCH sets (e.g., xPDCCH set 1 and xPDCCH set 2), can be partially overlapped. In the xPDCCH set 1, a localized mode can be used and a distributed mode can be used in the xPDCCH set 2. The numbering of xCCE index from xREG within the xPDCCH set can be defined as follows. In the first option (e.g., "Option 1"), 2 xREGs can be defined for 2 RBGs, as illustrated in table 1000 of FIG. 10, which illustrates xREG to xCCE mapping for 2 RBGs with 2 APs.

In the example of FIG. 10, for RGB Index 0, xREG 0 can be mapped to XCCE 0. xREG 1 is mapped to xCCE1. For RGB Index 1, xREG 0 is mapped to xCCE 2 and xREG 1 is mapped to xCCE 3.

In the option 1, 2 xREGs can also be defined for 4 RBGs, as defined in table 1100 of FIG. 11, which illustrates xREG to xCCE mapping for 4 RBGs with 2 APs. In a second option (e.g., "Option 2"), 1 xREG can be defined for 2 RBGs, as in table 1200 of FIG. 12, which illustrates xREG to xCCE mapping for 2 RBGs with 2 APs. In the option 2, 1 xREG can also be defined for 4 RBGs, as in table 1300 of FIG. 13, which illustrates xREG to xCCE mapping for 4 RBGs with 2 APs. It should be noted that similar designs and/or mapping can be extended to other numbers of RBGs.

In one aspect, a number of xCCE for one xPDCCH message can be defined as an aggregation level (AL). Further, multiple aggregation levels can be defined for one or more UEs so that the eNB can adjust the resource allocation for xPDCCH transmission depending on the link budget. For example, the AL can be specified as 1, 2, 4, 8 and/or 16. (The link budget can be the bandwidth between the UE and eNB—which can vary depending on interference. A UE can be assigned a higher link budget "broader bandwidth" when needed by aggregating multiple RBGs.) A UE can perform blind decoding on each potential xPDCCH candidate.

FIG. 14 illustrates a first example 1400 of extended control channel elements (xCCE) to extended physical downlink control channel (xPDCCH) (e.g., a 3 GPP LTE 5G physical downlink (DL) control channel) candidate mapping for two antenna ports (AP), AP 0 and AP 1. That is, FIG. 14 depicts an example of xCCE to xPDCCH candidate mapping for the option 1.

In one aspect, 4 RBGs can be configured and can be localized or distributed. Note that the number of xPDCCH candidates depends on the aggregation level and allocated RBG resources. Further, as shown in FIG. 14, for AL=2, the UE can combine two xCCEs in two APs for xPDCCH decoding, which may enjoy the benefit of polarization diversity. For localized transmission mode, xCCEs in consecutive RBGs are grouped to form one xPDCCH candidate; while for distributed transmission mode, xCCEs in distinct RBGs are grouped to form one xPDCCH candidate.

FIG. 15 illustrates a second example 500 of extended control channel elements (xCCE) to extended physical downlink (DL) control channel (xPDCCH) (e.g., a 3 GPP LTE 5G physical downlink (DL) control channel) candidate mapping for two antenna ports (AP). That is, FIG. 15 depicts an example of xCCE to xPDCCH candidate mapping for the option 2. In one aspect, a UE can switch from one AP to another in different RBGs for xPDCCH blind decoding. It should be noted that the xCCE to xPDCCH candidate mapping for other numbers of RBGs and ALs can be extended from the above examples. Further, for UE search space, a starting position of the xCCE that a UE needs to search can be defined as a function of Cell Radio Network Temporary Identifier (C-RNTI) and/or a symbol, slot, and/or subframe/frame index that can be defined similar to the hashing table as defined in 3 GPP LTE Rel. 11.

In one aspect, when performing blind decoding, a UE can identify which AP is to be used for xCCE demodulation. In one aspect, the AP association can be defined as a function of C-RNTI to enable multi user (MU)-MIMO as different users can be associated with different APs for blind decoding. For example, for the option 2, for UE #0, the AP used for the xPDCCH candidate #0 can be defined as AP #0 for RBG #0 and AP #1 for RBG #1. While for UE #1, the AP used for the xPDCCH candidate #0 can be defined as AP #1 for RBG #0 and AP #0 for RBG #1.

In an additional aspect, the AP association can be fixed for all UEs. The support of MU-MIMO can be enabled by applying different DMRS sequences for different users.

Figures 16, 17:
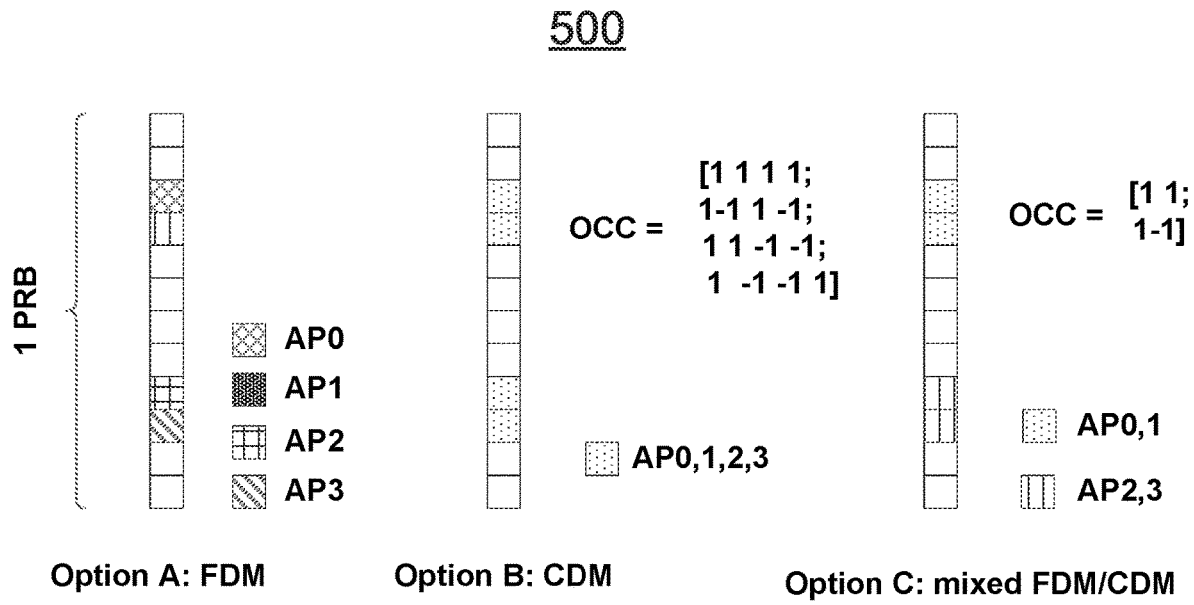
FIG. 16 illustrates a DeModulation Reference Signal (DMRS) pattern for a third generation partnership project (3 GPP) fifth generation (5G) physical downlink (DL) control channel (xPDCCH) for four antenna ports in accordance with an example.
FIG. 17 illustrates a table defining orthogonal cover codes (OCC) for four antenna ports in accordance with an example.

Turning now to FIG. 16, example 600 of DMRS patterns for an extended physical downlink (DL) control channel (xPDCCH) for four antenna ports (0, 1, 2, 3) is depicted. In one aspect, in FIG. 16 for option A, only FDM is applied, and each AP occupies one RE and no OCC is used. In one aspect, in FIG. 16 for option B, only CDM is applied and OCC with length of 4 is used. In one aspect, in FIG. 16 for option C, both CDM and FDM are applied and OCC with length of 2 is used on two REs. That is, FIG. 16 illustrates the DMRS pattern for xPDCCH transmission with four APs. In particular, the DMRS for different APs can be multiplexed in FDM, CDM and/or a mixed CDM/FDM. In the case for the mixed CDM/FDM based multiplexing, the OCC applied on the DMRS can reuse table 600 of FIG. 6. In the case for the CDM based multiplexing, the OCC applied on the DM-RS can be defined as orthogonal cover codes (OCC) for four antenna ports (as in option B), and two antenna ports (as in option C), as depicted in table 1700 of FIG. 17. The OCC can be based on a length-4 Walsh-Hadamard code. The orthogonal sequences can be represented as $[W_p(o) \ldots W_p(3)]$.

That is, FIG. 17 depicts, that AP0-AP3 can each use length-4 OCCs [1, 1, 1, 1], [+1 −1 +1 −1], [+1 +1 −1 −1], and/or [+1 −1 −1 +1]. For example, each OCC can be associate with each AP, such as AP0 being associated with OCC [+1 +1 +1 +1], AP1 being associated OCC [+1 −1 +1 −1], AP2 can be associated with OCC [+1 +1 −1 −1], and/or AP 3 being associated with OCC [+1 −1 −1 +1].

Figure 18:
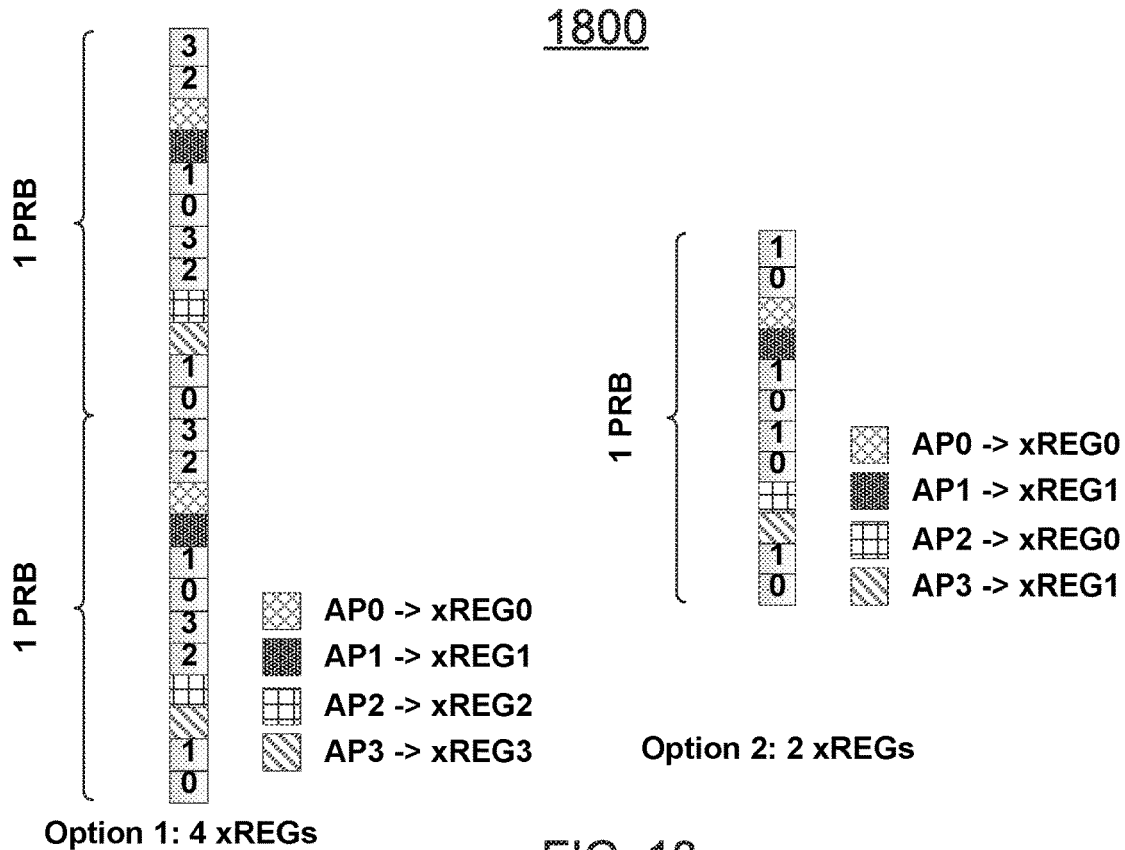
FIG. 18 illustrates a first example of mapping a third generation partnership project (3 GPP) fifth generation (5G) resource element groups (xREG) to resource elements (RE) for four (4) antenna ports (AP) in accordance with an example.
Figure 19:
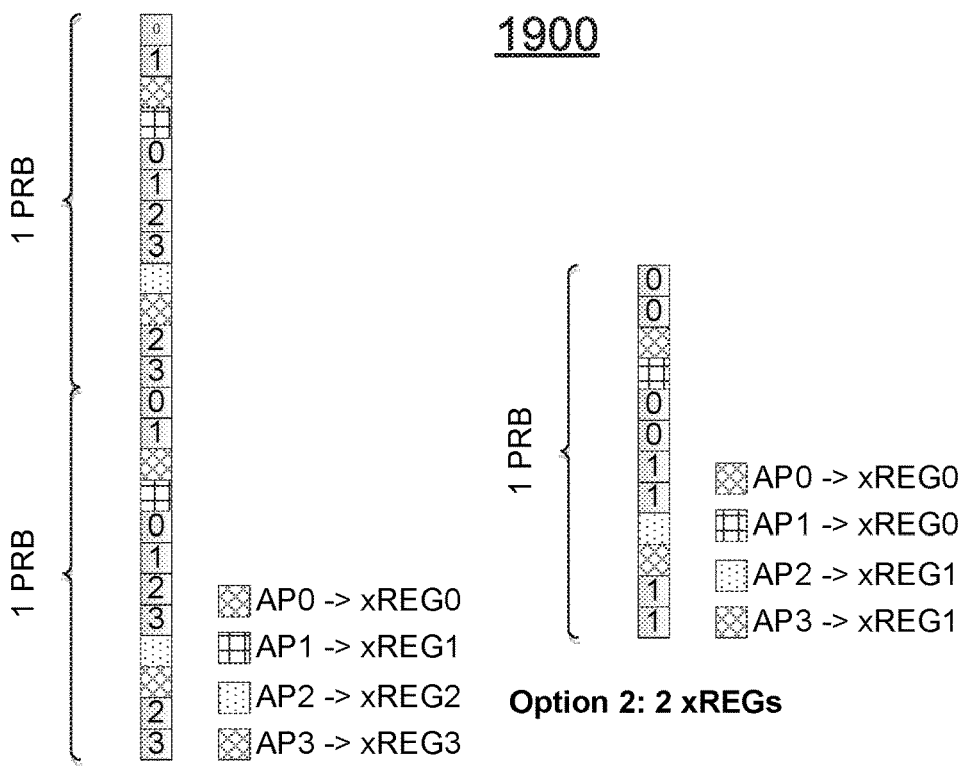
FIG. 19 illustrates a second example of mapping a third generation partnership project (3 GPP) fifth generation (5G)

FIG. 18 illustrates a first example of mapping an extended resource element groups (xREG) to resource elements (RE) for four (4) antenna ports (AP). That is, FIG. 19 illustrates the xREG to RE mapping for four APs case in the case when the DMRS for different APs are multiplexed in the FDM manner. The examples can be easily extended for other multiplexing schemes. In FIG. 18, two options are considered depending on whether 2 or 4 xREGs are defined for xPDCCH transmission. In various aspects, one or more xREGs can be located close to a corresponding DMRS of the xREG, as depicted in FIG. 19, thereby achieving more efficient decoding performance.

For option 1, a numbering of xCCE index from xREG within the xPDCCH set for four APs can be defined as follows. In option 1, 4 xREGs can be defined for 2 RBGs, as depicted in table 2000 of FIG. 20, which depicts xREG to xCCE mapping for 2 RBGs with 4 APs. In the option 1, 4 xREGs can be defined for 4 RBGs, as defined in table 2100 of FIG. 21, which depicts xREG to xCCE mapping for 4 RBGs with 4 APs. In the option 2, 2 xREGs can be defined for 2 RBGs, as defined in table 2200 of FIG. 22, which depicts xREG to xCCE mapping for 2 RBGs with 4 APs. In the option 2, 2 xREGs can be defined for 4 RBG, as defined in table 2300 of FIG. 23, which depicts xREG to xCCE mapping for 3 RBGs with 4 APs. Similar designs and configurations can be extended to other numbers of RBGs.

FIG. 24 illustrates first example of extended control channel elements (xCCE) to extended physical downlink (DL) control channel (xPDCCH) (e.g., a 3 GPP LTE 5G physical downlink (DL) control channel) candidate mapping for four antenna ports (AP). That is, FIG. 24 depicts an example 2400 of xCCE to xPDCCH candidate mapping for 4 APs for the option 1.

FIG. 25 illustrates a second example of extended control channel elements (xCCE) to extended physical downlink (DL) control channel (xPDCCH) (e.g., a 3 GPP LTE 5G physical downlink (DL) control channel) candidate mapping for four antenna ports (AP). That is, FIG. 25 depicts example 2500 of xCCE to xPDCCH candidate mapping for 4 APs for the option 2. In various aspects, the xCCE to xPDCCH candidate mapping for other number of RBGs and ALs can be straightforwardly extended from the above examples.

Another example provides functionality 2600 of an eNodeB to communicate with a user equipment (UE) using an extended physical downlink (DL) control channel (xPDCCH) (e.g., a 3 GPP LTE 5G physical downlink (DL)

control channel), as shown in the flow chart in FIG. 26. The functionality 2600 can be implemented as a method or the functionality can be executed as instructions on a machine, where the instructions are included one or more computer readable mediums or one or more non-transitory machine readable storage mediums. The eNodeB can comprise one or more processors and memory configured to: Process reference signals to form an orthogonal frequency-division multiplexing (OFDM) symbol comprising a DeModulation Reference signal (DM-RS) for a first antenna port (AP) multiplexed in a physical resource block with a DM-RS for a second antenna port (AP), as in block 2610. The eNodeB can comprise one or more processors and memory configured to: process, for transmission to the UE, the OFDM symbol using an extended physical downlink control channel (xPDCCH), as in block 2620.

Another example provides functionality 2700 of a user equipment (UE) to communicate with an eNodeB using an extended physical downlink (DL) control channel (xPD-CCH) within a wireless communication network, as shown in the flow chart in FIG. 27. The functionality 2700 can be implemented as a method or the functionality can be executed as instructions on a machine, where the instructions are included one or more computer readable mediums or one or more non-transitory machine readable storage mediums. The UE can comprise one or more processors and memory configured to: Process an orthogonal frequency-division multiplexing (OFDM) symbol, received from the eNodeB, that include reference signals, the OFDM symbol comprising a DeModulation Reference signal (DM-RS) for a first antenna port (AP) multiplexed in a physical resource block with a DM-RS for a second antenna port (AP), as in block 2710. The UE can comprise one or more processors and memory configured to: process the OFDM symbol, received from the eNodeB using an extended physical downlink control channel (xPDCCH), as in block 2720.

Another example provides functionality 2800 of an eNodeB to communicate with a user equipment (UE) using a third generation partnership project (3 GPP) fifth generation (5G) control channel, as shown in the flow chart in FIG. 28. The functionality 2800 can be implemented as a method or the functionality can be executed as instructions on a machine, where the instructions are included one or more computer readable mediums or one or more non-transitory machine readable storage mediums. The eNodeB can comprise one or more processors and memory configured to: process reference signals to form an OFDM symbol comprising a DeModulation Reference signal (DM-RS) for a first antenna port (AP) multiplexed in a physical resource block with a DM-RS for a second AP, and a DM-RS for a third AP multiplexed in the physical resource block with a DM-RS for a fourth AP, as in block 2810. The eNodeB can process, for transmission to the UE, the OFDM symbol using an extended physical downlink control channel (xPD-CCH), as in block 2820.

In one aspect, in place of and/or as part of functionality of 2600, 2700, and/or 2800, the eNodeB can identify one or more parameters of a third generation partnership project (3 GPP) fifth generation (5G) physical control channel (xPD-CCH). The eNodeB can process, for transmission to the UE, one or more messages on the xPDCCH according to the one or more parameters.

FIG. 29 illustrates a diagram of example components of a User Equipment (UE) device in accordance with an example. FIG. 29 illustrates, for one aspect, example components of a User Equipment (UE) device 2900. In some aspects, the UE device 2900 can include application circuitry 2902, baseband circuitry 2904, Radio Frequency (RF) circuitry 2906, front-end module (FEM) circuitry 2908 and one or more antennas 2910, coupled together at least as shown.

The application circuitry 2902 can include one or more application processors. For example, the application circuitry 2902 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The processor(s) can include any combination of general-purpose processors and dedicated processors (e.g., graphics processors, application processors, etc.). The processors can be coupled with and/or can include a storage medium 2912, and can be configured to execute instructions stored in the storage medium 2912 to enable various applications and/or operating systems to run on the system.

The baseband circuitry 2904 can include circuitry such as, but not limited to, one or more single-core or multi-core processors. The baseband circuitry 2904 can include one or more baseband processors and/or control logic to process baseband signals received from a receive signal path of the RF circuitry 2906 and to generate baseband signals for a transmit signal path of the RF circuitry 2906. Baseband processing circuitry 2904 can interface with the application circuitry 2902 for generation and processing of the baseband signals and for controlling operations of the RF circuitry 2906. For example, in some aspects, the baseband circuitry 2904 can include a second generation (2G) baseband processor 2904a, third generation (3G) baseband processor 2904b, fourth generation (4G) baseband processor 2904c, and/or other baseband processor(s) 2904d for other existing generations, generations in development or to be developed in the future (e.g., fifth generation (5G), 6G, etc.). The baseband circuitry 2904 (e.g., one or more of baseband processors 2904a-d) can handle various radio control functions that enable communication with one or more radio networks via the RF circuitry 2906. The radio control functions can include, but are not limited to, signal modulation/demodulation, encoding/decoding, radio frequency shifting, etc. In some aspects, modulation/demodulation circuitry of the baseband circuitry 2904 can include Fast-Fourier Transform (FFT), precoding, and/or constellation mapping/demapping functionality. In some aspects, encoding/decoding circuitry of the baseband circuitry 2904 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 2904 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 2904e of the baseband circuitry 2904 can be configured to run elements of the protocol stack for signaling of the PHY, MAC, RLC, PDCP and/or RRC layers. In some aspects, the baseband circuitry can include one or more audio digital signal processor(s) (DSP) 2904f. The audio DSP(s) 2904f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 2904 and the application circuitry 2902 can be implemented together such as, for example, on a system on a chip (SOC).

In some aspects, the baseband circuitry 2904 can provide for communication compatible with one or more radio technologies. For example, in some aspects, the baseband circuitry 2904 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 2904 is configured to support radio communications of more than one wireless protocol can be referred to as multi-mode baseband circuitry.

RF circuitry 2906 can enable communication with wireless networks using modulated electromagnetic radiation through a non-solid medium. In various aspects, the RF circuitry 2906 can include switches, filters, amplifiers, etc. to facilitate the communication with the wireless network. RF circuitry 2906 can include a receive signal path which can include circuitry to down-convert RF signals received from the FEM circuitry 2908 and provide baseband signals to the baseband circuitry 2904. RF circuitry 2906 can also include a transmit signal path which can include circuitry to up-convert baseband signals provided by the baseband circuitry 2904 and provide RF output signals to the FEM circuitry 2908 for transmission.

In some aspects, the RF circuitry 2906 can include a receive signal path and a transmit signal path. The receive signal path of the RF circuitry 2906 can include mixer circuitry 2906a, amplifier circuitry 2906b and filter circuitry 2906c. The transmit signal path of the RF circuitry 2906 can include filter circuitry 2906c and mixer circuitry 2906a. RF circuitry 2906 can also include synthesizer circuitry 2906d for synthesizing a frequency for use by the mixer circuitry 2906a of the receive signal path and the transmit signal path. In some aspects, the mixer circuitry 2906a of the receive signal path can be configured to down-convert RF signals received from the FEM circuitry 2908 based on the synthesized frequency provided by synthesizer circuitry 2906d. The amplifier circuitry 2906b can be configured to amplify the down-converted signals and the filter circuitry 2906c can be a low-pass filter (LPF) or band-pass filter (BPF) configured to remove unwanted signals from the down-converted signals to generate output baseband signals. Output baseband signals can be provided to the baseband circuitry 2904 for further processing. In some aspects, the output baseband signals can be zero-frequency baseband signals, although the output baseband signals do not have to be zero-frequency baseband signals. In some aspects, mixer circuitry 2906a of the receive signal path can comprise passive mixers, although the scope of the aspects is not limited in this respect.

In some aspects, the mixer circuitry 2906a of the transmit signal path can be configured to up-convert input baseband signals based on the synthesized frequency provided by the synthesizer circuitry 2906d to generate RF output signals for the FEM circuitry 2908. The baseband signals can be provided by the baseband circuitry 2904 and can be filtered by filter circuitry 2906c. The filter circuitry 2906c can include a low-pass filter (LPF), although the scope of the aspects is not limited in this respect.

In some aspects, the mixer circuitry 2906a of the receive signal path and the mixer circuitry 2906a of the transmit signal path can include two or more mixers and can be arranged for quadrature downconversion and/or upconversion respectively. In some aspects, the mixer circuitry 2906a of the receive signal path and the mixer circuitry 2906a of the transmit signal path can include two or more mixers and can be arranged for image rejection (e.g., Hartley image rejection). In some aspects, the mixer circuitry 2906a of the receive signal path and the mixer circuitry 2906a can be arranged for direct downconversion and/or direct upconversion, respectively. In some aspects, the mixer circuitry 2906a of the receive signal path and the mixer circuitry 2906a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 2906 can include analog-to-digital converter (ADC) and digital-to-analog converter (DAC) circuitry and the baseband circuitry 2904 can include a digital baseband interface to communicate with the RF circuitry 2906.

In some dual-mode embodiments, a separate radio IC circuitry can be provided for processing signals for each spectrum, although the scope of the embodiments is not limited in this respect.

In some embodiments, the synthesizer circuitry 2906d can be a fractional-N synthesizer or a fractional N/N+1 synthesizer, although the scope of the embodiments is not limited in this respect as other types of frequency synthesizers can be suitable. For example, synthesizer circuitry 2906d can be a delta-sigma synthesizer, a frequency multiplier, or a synthesizer comprising a phase-locked loop with a frequency divider.

The synthesizer circuitry 2906d can be configured to synthesize an output frequency for use by the mixer circuitry 2906a of the RF circuitry 2906 based on a frequency input and a divider control input. In some embodiments, the synthesizer circuitry 2906d can be a fractional N/N+1 synthesizer.

In some embodiments, frequency input can be provided by a voltage controlled oscillator (VCO), although that is not a constraint. Divider control input can be provided by either the baseband circuitry 2904 or the applications processor 2902 depending on the desired output frequency. In some embodiments, a divider control input (e.g., N) can be determined from a look-up table based on a channel indicated by the applications processor 2902.

Synthesizer circuitry 2906d of the RF circuitry 2906 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2906d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 2906 can include an IQ/polar converter.

FEM circuitry 2908 can include a receive signal path which can include circuitry configured to operate on RF signals received from one or more antennas 2910, amplify the received signals and provide the amplified versions of the received signals to the RF circuitry 2906 for further processing. FEM circuitry 2908 can also include a transmit signal path which can include circuitry configured to amplify signals for transmission provided by the RF circuitry 2906 for transmission by one or more of the one or more antennas 2910.

In some embodiments, the FEM circuitry 2908 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 2906). The transmit signal path of the FEM circuitry 2908 can include a power amplifier (PA) to amplify input RF signals (e.g., provided by RF circuitry 2906), and one or more filters to generate RF signals for subsequent transmission (e.g., by one or more of the one or more antennas 2910.

In some embodiments, the UE device 2900 can include additional elements such as, for example, memory/storage, display, camera, sensor, and/or input/output (I/O) interface.

FIG. 30 illustrates a diagram of a wireless device (e.g., UE) in accordance with an example. FIG. 30 provides an example illustration of the wireless device, such as a user equipment (UE) UE, a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3 GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

FIG. 31 illustrates a diagram 3100 of a node 3110 (e.g., eNB and/or a base station) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 3110 can include a node device 3112. The node device 3112 or the node 3110 can be configured to communicate with the wireless device 3120. The node device 3112 can be configured to implement the technology described. The node device 3112 can include a processing module 3114 and a transceiver module 3116. In one aspect, the node device 3112 can include the transceiver module 3116 and the processing module 3114 forming a circuitry 3118 for the node 3110. In one aspect, the transceiver module 3116 and the processing module 3114 can form a circuitry of the node device 3112. The processing module 3114 can include one or more processors and memory. In one embodiment, the processing module 3122 can include one or more application processors. The transceiver module 3116 can include a transceiver and one or more processors and memory. In one embodiment, the transceiver module 3116 can include a baseband processor.

The wireless device 3120 can include a transceiver module 3124 and a processing module 3122. The processing module 3122 can include one or more processors and memory. In one embodiment, the processing module 3122 can include one or more application processors. The transceiver module 3124 can include a transceiver and one or more processors and memory. In one embodiment, the transceiver module 3124 can include a baseband processor. The wireless device 3120 can be configured to implement the technology described. The node 3110 and the wireless devices 3120 can also include one or more storage mediums, such as the transceiver module 3116, 3124 and/or the processing module 3114, 3122. In one aspect, the components described herein of the transceiver module 3116 can be included in one or more separate devices that may used in a cloud-RAN (C-RAN) environment.

EXAMPLES

The following examples pertain to specific invention embodiments and point out specific features, elements, or steps that can be used or otherwise combined in achieving such embodiments.

Example 1 includes an apparatus of an eNodeB, the eNodeB configured to communicate with a User Equipment (UE), the apparatus comprising one or more processors and memory configured to: process reference signals to form an orthogonal frequency-division multiplexing (OFDM) symbol comprising a DeModulation Reference signal (DM-RS) for a first antenna port (AP) multiplexed in a physical resource block with a DM-RS for a second antenna port (AP); and process, for transmission to the UE, the OFDM symbol using an extended physical downlink control channel (xPDCCH).

Example 2 includes the apparatus of example 1 or 2, wherein the DM-RS for the first AP and the DM-RS for the second AP are multiplexed using frequency-division multiplexing (FDM) or Code Division Multiplexing (CDM), wherein an orthogonal cover code (OCC) is applied for the CDM to distinguish the first AP from the second AP.

Example 3 includes the apparatus of example 2, wherein a first extended resource element group (xREG) is associated with the first AP and a second xREG is associated with the second AP, and each of the first xREG and the second xREG occupy four resource elements in the physical resource block.

Example 4 includes the apparatus of example 1 or 3, wherein a first extended resource element group (xREG) occupies a first four resource elements in the physical resource block and a second xREG occupies a second four resource elements in the physical resource block.

Example 5 includes the apparatus of example 4, wherein the one or more processors and memory are further configured to use K contiguous extended resource element groups (xREGs) to form an extended control channel element (xCCE).

Example 6 includes the apparatus of example 1 or 5, wherein the one or more processors and memory are further configured to: map one or more extended resource element groups (xREGs) to one or more extended control channel element (xCCE) with two antenna ports (AP) or four antenna ports (AP) according to at least one of:

a) an xREG to xCCE mapping table for at least two resource block groups (RGBs) using two antenna ports according to:

| RBG index | xREG → xCCE | |
|---|---|---|
| 0 | 0 → 0 | 1 → 1 |
| 1 | 0 → 2 | 1 → 3; | b) an xREG to xCCE mapping table for at least four resource block groups (RGBs) using two antenna ports according to:

| RBG index | xREG → xCCE | |
|---|---|---|
| 0 | 0 → 0 | 1 → 1 |
| 1 | 0 → 2 | 1 → 3 |
| 2 | 0 → 4 | 1 → 5 |
| 3 | 0 → 6 | 1 → 7; | c) an xREG to xCCE mapping table for at least two resource block groups (RGBs) using four antenna ports according to:

| RBG index | xREG → xCCE | | | |
|---|---|---|---|---|
| 0 | 0 → 0 | 1 → 1 | 2 → 4 | 3 → 5 |
| 1 | 0 → 2 | 1 → 3 | 2 → 6 | 3 → 7; | or d) an xREG to xCCE mapping table for at least four resource block groups (RGBs) using four antenna ports according to:

| RBG index | xREG → xCCE | | | |
|---|---|---|---|---|
| 0 | 0 → 0 | 1 → 1 | 2 → 8 | 3 → 9 |
| 1 | 0 → 2 | 1 → 3 | 2 → 10 | 3 → 11 |
| 2 | 0 → 4 | 1 → 5 | 2 → 12 | 3 → 13 |
| 3 | 0 → 6 | 1 → 7 | 2 → 14 | 3 → 15; | or map one or more extended resource element groups (xREGs) to one or more extended control channel element (xCCE) with two antenna ports (AP) or four antenna ports (AP) according to at least one of:

e) an xREG to xCCE mapping table for at least two resource block groups (RGBs) using two antenna ports according to:

| RBG index | xREG → xCCE |
|---|---|
| 0 | 0 → 0 |
| 1 | 0 → 1; | f) an xREG to xCCE mapping table for at least four resource block groups (RGBs) using two antenna ports according to:

| RBG index | xREG → xCCE |
|---|---|
| 0 | 0 → 0 |
| 1 | 0 → 1 |
| 2 | 0 → 2 |
| 3 | 0 → 3; | g) an xREG to xCCE mapping table for at least two resource block groups (RGBs) using four antenna ports according to:

| RBG index | xREG → xCCE | |
|---|---|---|
| 0 | 0 → 0 | 1 → 1 |
| 1 | 0 → 2 | 1 → 3; | or h) an xREG to xCCE mapping table for at least four resource block groups (RGBs) using four antenna ports according to:

| RBG index | xREG → xCCE | |
|---|---|---|
| 0 | 0 → 0 | 1 → 1 |
| 1 | 0 → 2 | 1 → 3 |
| 2 | 0 → 4 | 1 → 5 |
| 3 | 0 → 6 | 1 → 7. |

Example 7 includes the apparatus of example 6, wherein each one of the K contiguous xREGs include a first extended resource element group (xREG) that is associated with the first AP and a second xREG that is associated with the second AP, and each of the first xREG and the second xREG occupy four resource elements in a physical resource block, wherein the K xREGs indicate the xCCE has resource elements equal to the four resource elements multiplied by K of the K contiguous xREGs and occupies K physical resource blocks in a frequency domain, wherein K is a positive integer.

Example 8 includes the apparatus of example 1 or 7, wherein each one of the K contiguous xREGs include a first extended resource element group (xREG) that occupies a first four resource elements in the physical resource block and a second xREG that occupies a second four resource elements in the physical resource block, wherein the K xREGs indicate the xCCE has resource elements equal to the first four and second four resource elements added together and multiplied by ½ K of the K contiguous xREGs and occupies K physical resource blocks in a frequency domain, wherein K is a positive integer.

Example 9 includes the apparatus of example 8, wherein the UE is configured with up to N xPDCCH sets, wherein each xPDCCH set includes M physical resource block groups (RBG) and each xPDCCH set is either localized or distributed, wherein K, M, and N are positive integers.

Example 10 includes the apparatus of example 1 or 9, wherein an xCCE index from an xREG in the xPDCCH set is defined as having two RBG for the first xREG associated with the first AP and the second xREG associated with the second AP, or the xCCE index from the xREG in the xPDCCH set is defined as having two RBG for the first xREG that occupies the first four resource elements in the physical resource block and the second xREG that occupies the second four resource elements in the physical resource block.

Example 11 includes the apparatus of example 1 or 10, wherein the one or more processors and memory are further configured to signal, by higher layers via a UE specific dedicated RRC signalling, a configuration of the xPDCCH transmission having one of the N xPDCCH sets including whether the one of the N xPDCCH sets is either localized or distributed.

Example 12 includes the apparatus of example 11, wherein the one or more processors and memory are further configured to define L xCCE as an aggregation level for one xPDCCH message, wherein L is a positive integer and a number of xPDCCH transmission candidates are dependent on the aggregation level.

Example 13 includes the apparatus of example 1 or 12, wherein the one or more processors and memory are further configured to partially overlap a first xPDCCH with a second xPDCCH, wherein the first xPDCCH is uses a localized mode and the second xPDCCH uses a distributed mode.

Example 14 includes the apparatus of example 13, wherein the one or more processors and memory are further configured to use one or more of a plurality of mapping configurations for mapping the xREG to the xCCE for two APs.

Example 15 includes the apparatus of example 1 or 14, wherein the one or more processors and memory are further configured to use one or more of the plurality of mapping configurations from the xREG to the xCCE for four APs.

Example 16 includes the apparatus of example 15, wherein the one or more processors and memory are further configured to use one or more of the plurality of mapping configurations from the xCCE to an xPDCCH candidate for two APs.

Example 17 includes the apparatus of example 1 or 16, wherein the one or more processors and memory are further configured to use one or more of the plurality of mapping configurations from the xCCE to the xPDCCH candidate for four APs.

Example 18 includes the apparatus of example 17, wherein the one or more processors and memory are further configured to combine L xCCE in one or more antenna ports to enable the UE to perform blind decoding on the xPDCCH candidate having different aggregation levels, wherein L is a positive integer.

Example 19 includes the apparatus of example 1 or 18, wherein the one or more processors and memory are further configured to: define a starting position of xCCE as a function of a Cell Radio Network Temporary Identifier (C-RNTI), a symbol, slot, subframe, or a frame index; define an AP association for one UE as a function of the C-RNTI; or fix the AP association for all UEs.

Example 20 includes an apparatus of a user equipment (UE), the UE configured to communicate with a eNodeB, the apparatus comprising one or more processors and memory configured to: process an orthogonal frequency-division multiplexing (OFDM) symbol, received from the eNodeB, that include reference signals, the OFDM symbol comprising a DeModulation Reference signal (DM-RS) for a first antenna port (AP) multiplexed in a physical resource block with a DM-RS for a second antenna port (AP); and process the OFDM symbol, received from the eNodeB using an extended physical downlink control channel (xPDCCH).

Example 21 includes the apparatus of example 20, wherein the one or more processors and memory are further configured to use two or more antenna ports (AP) for transmission of the xPDCCH, and wherein the DM-RS for the first AP and the DM-RS for the second AP are multiplexed using frequency-division multiplexing (FDM) or Code Division Multiplexing (CDM).

Example 22 includes the apparatus of example 20 or 21, wherein a first extended resource element group (xREG) is associated with the first AP and a second xREG is associated with the second AP, and each of the first xREG and the second xREG occupy four resource elements in the physical resource block, or wherein a first extended resource element group (xREG) occupies a first four resource elements in the physical resource block and a second xREG occupies a second four resource elements in the physical resource block, and wherein K contiguous extended resource element groups (xREGs) are used to form an extended control channel element (xCCE), wherein the UE is configured with up to N xPDCCH sets, wherein each xPDCCH set includes M physical resource block group (RBG) and each xPDCCH set is either localized or distributed, wherein K, M, and N are positive integers.

Example 23 includes the apparatus of example 22, wherein the one or more processors and memory are further configured to process a signal, received from the eNodeB using higher layers via a UE specific dedicated RRC signalling, indicating a configuration of the xPDCCH transmission having one of the N xPDCCH sets including whether the one of the N xPDCCH sets is either localized or distributed.

Example 24 includes the apparatus of example 20 or 23, wherein the one or more processors and memory are further configured to: process one or more of a plurality of mapping configurations from the xREG to the xCCE for the first AP and the second AP; process one or more of the plurality of mapping configurations from the xREG to the xCCE for the first AP, the second AP, a third AP and a fourth AP; process one or more of the plurality of mapping configurations from the xCCE to an xPDCCH candidate for the first AP and the second AP; process one or more of the plurality of mapping configurations from the xCCE to the xPDCCH candidate for the first AP, the second AP, the third AP and the fourth AP; or perform blind decoding on the xPDCCH candidate having different aggregation levels.

Example 25 includes the apparatus of example 20, wherein the apparatus includes at least one of an antenna, a touch sensitive display screen, a speaker, a microphone, a graphics processor, an application processor, a baseband processor, an internal memory, a non-volatile memory port, and combinations thereof.

Example 26 includes least one machine readable storage medium having instructions embodied thereon for an eNodeB to communicate with a User Equipment (UE), the instructions when executed cause the eNodeB to: process reference signals to form an OFDM symbol comprising a DeModulation Reference signal (DM-RS) for a first antenna port (AP) multiplexed in a physical resource block with a DM-RS for a second AP, and a DM-RS for a third AP multiplexed in the physical resource block with a DM-RS for a fourth AP; and process, for transmission to the UE, the OFDM symbol using an extended physical downlink control channel (xPDCCH).

Example 27 includes at least one machine readable storage medium of example 26, wherein the DM-RS for the first AP, the DM-RS for the second AP, the DM-RS for the third AP, and the DM-RS for the fourth AP are multiplexed using frequency-division multiplexing (FDM) or Code Division Multiplexing (CDM).

Example 28 includes at least one machine readable storage medium of example 26 or 27, wherein a first extended resource element group (xREG) is associated with the first AP, a second xREG is associated with the second AP, a third xREG is associated with the third AP, and a fourth xREG is associated with the fourth AP, and each of the first xREG, the second xREG, the third xREG, and the fourth xREG occupy four resource elements in the physical resource block.

Example 29 includes at least one machine readable storage medium of example 26, wherein a first extended resource element group (xREG) occupies a first four resource elements in the physical resource block, a second xREG occupies a second four resource elements, a third xREG occupies a third four resource elements, and a fourth xREG occupies a fourth four resource elements in the physical resource block.

Example 30 includes at least one machine readable storage medium of example 26 or 29, wherein the one or more processors and memory are further configured to: use K contiguous extended resource element groups (xREGs) to form an extended control channel element (xCCE); use one or more of a plurality of mapping configurations from the xREG to the xCCE for the first AP and the second AP; use one or more of the plurality of mapping configurations from the xREG to the xCCE for the first AP, the second AP, a third AP and a fourth AP; wherein an xCCE index from an xREG in the xPDCCH set is defined as having two RBG for the first xREG associated with the first AP, the second xREG that is associated with the second AP, the third xREG that is associated with the third AP, and the fourth xREG that is associated with the fourth AP, or the xCCE index from the xREG in the xPDCCH set is defined as having four RBG for the first xREG associated with the first AP, the second xREG that is associated with the second AP, the third xREG that is associated with the third AP, and the fourth xREG that is associated with the fourth AP; use one or more of the plurality of mapping configurations from the xCCE to an xPDCCH candidate for the first AP, the second AP, the third AP, and the fourth AP; use one or more of the plurality of mapping configurations from the xCCE to the xPDCCH candidate for the first AP, the second AP, the third AP and the fourth AP; use K contiguous physical resource blocks (PRB) as one PRG group of the xPDCCH transmission, wherein the UE is configured with up to N xPDCCH sets, wherein each xPDCCH set includes M physical resource block groups (RBG) and each xPDCCH set is either localized or distributed, wherein K, M, and N are positive integer; and/or apply an orthogonal cover code (OCC) when multiplexing one or more DeModulation Reference signals (DM-RS) using the CDM between the first AP, the second AP, the third AP or the fourth AP.

Example 31 includes an apparatus of an eNodeB, the eNodeB configured to communicate with a User Equipment (UE), the apparatus comprising one or more processors and memory configured to: process reference signals to form an orthogonal frequency-division multiplexing (OFDM) symbol comprising a DeModulation Reference signal (DM-RS) for a first antenna port (AP) multiplexed in a physical resource block with a DM-RS for a second antenna port (AP); and process, for transmission to the UE, the OFDM symbol using an extended physical downlink control channel (xPDCCH).

Example 32 includes the apparatus of example 31, wherein the DM-RS for the first AP and the DM-RS for the second AP are multiplexed using frequency-division multiplexing (FDM) or Code Division Multiplexing (CDM), wherein an orthogonal cover code (OCC) is applied for the CDM to distinguish the first AP from the second AP.

Example 33 includes the apparatus of example 32, wherein a first extended resource element group (xREG) is associated with the first AP and a second xREG is associated with the second AP, and each of the first xREG and the second xREG occupy four resource elements in the physical resource block.

Example 34 includes the apparatus of example 31, wherein a first extended resource element group (xREG) occupies a first four resource elements in the physical resource block and a second xREG occupies a second four resource elements in the physical resource block.

Example 35 includes the apparatus of example 31, wherein the one or more processors and memory are further configured to use K contiguous extended resource element groups (xREGs) to form an extended control channel element (xCCE).

Example 36 includes the apparatus of example 31, wherein the one or more processors and memory are further configured to: map one or more extended resource element groups (xREGs) to one or more extended control channel element (xCCE) with two antenna ports (AP) or four antenna ports (AP) according to at least one of:

a) an xREG to xCCE mapping table for at least two resource block groups (RBGs) using two antenna ports according to:

| RBG index | xREG → xCCE | |
|---|---|---|
| 0 | 0 → 0 | 1 → 1 |
| 1 | 0 → 2 | 1 → 3; | b) an xREG to xCCE mapping table for at least four resource block groups (RBGs) using two antenna ports according to:

| RBG index | xREG → xCCE | |
|---|---|---|
| 0 | 0 → 0 | 1 → 1 |
| 1 | 0 → 2 | 1 → 3 |

-continued

| RBG index | xREG → xCCE | |
|---|---|---|
| 2 | 0 → 4 | 1 → 5 |
| 3 | 0 → 6 | 1 → 7; | c) an xREG to xCCE mapping table for at least two resource block groups (RGBs) using four antenna ports according to:

| RBG index | xREG → xCCE | | | |
|---|---|---|---|---|
| 0 | 0 → 0 | 1 → 1 | 2 → 4 | 3 → 5 |
| 1 | 0 → 2 | 1 → 3 | 2 → 6 | 3 → 7; | or d) an xREG to xCCE mapping table for at least four resource block groups (RGBs) using four antenna ports according to:

| RBG index | xREG → xCCE | | | |
|---|---|---|---|---|
| 0 | 0 → 0 | 1 → 1 | 2 → 8 | 3 → 9 |
| 1 | 0 → 2 | 1 → 3 | 2 → 10 | 3 → 11 |
| 2 | 0 → 4 | 1 → 5 | 2 → 12 | 3 → 13 |
| 3 | 0 → 6 | 1 → 7 | 2 → 14 | 3 → 15; | or map one or more extended resource element groups (xREGs) to one or more extended control channel element (xCCE) with two antenna ports (AP) or four antenna ports (AP) according to at least one of:

f) an xREG to xCCE mapping table for at least two resource block groups (RGBs) using two antenna ports according to:

| RBG index | xREG → xCCE |
|---|---|
| 0 | 0 → 0 |
| 1 | 0 → 1; | f) an xREG to xCCE mapping table for at least four resource block groups (RGBs) using two antenna ports according to:

| RBG index | xREG → xCCE |
|---|---|
| 0 | 0 → 0 |
| 1 | 0 → 1 |
| 2 | 0 → 2 |
| 3 | 0 → 3; | g) an xREG to xCCE mapping table for at least two resource block groups (RGBs) using four antenna ports according to:

| RBG index | xREG → xCCE | |
|---|---|---|
| 0 | 0 → 0 | 1 → 1 |
| 1 | 0 → 2 | 1 → 3; | or h) an xREG to xCCE mapping table for at least four resource block groups (RGBs) using four antenna ports according to:

| RBG index | xREG → xCCE | |
|---|---|---|
| 0 | 0 → 0 | 1 → 1 |
| 1 | 0 → 2 | 1 → 3 |
| 2 | 0 → 4 | 1 → 5 |
| 3 | 0 → 6 | 1 → 7. |

Example 37 includes the apparatus of example 31, wherein each one of the K contiguous extended resource element groups (xREGs) include a first extended resource element group (xREG) that is associated with the first AP and a second xREG that is associated with the second AP, and each of the first xREG and the second xREG occupy four resource elements in a physical resource block, wherein the K xREGs indicate an extended control channel element (xCCE) has resource elements equal to the four resource elements multiplied by K of the K contiguous xREGs and occupies K physical resource blocks in a frequency domain, wherein K is a positive integer.

Example 38 includes the apparatus of example 31, wherein each one of the K contiguous extended resource element groups (xREGs) include a first extended resource element group (xREG) that occupies a first four resource elements in the physical resource block and a second xREG that occupies a second four resource elements in the physical resource block, wherein the K xREGs indicate an extended control channel element (xCCE) has resource elements equal to the first four and second four resource elements added together and multiplied by ½ K of the K contiguous xREGs and occupies K physical resource blocks in a frequency domain, wherein K is a positive integer.

Example 39 includes the apparatus of example 31, wherein the UE is configured with up to N xPDCCH sets, wherein each xPDCCH set includes M physical resource block groups (RBG) and each xPDCCH set is either localized or distributed, wherein K, M, and N are positive integers.

Example 40 includes the apparatus of example 31, wherein an extended control channel element (xCCE) index from an extended resource element group (xREG) in the xPDCCH set is defined as having two RBG for the first xREG associated with the first AP and the second xREG associated with the second AP, or the xCCE index from the xREG in the xPDCCH set is defined as having two RBG for the first xREG that occupies the first four resource elements in the physical resource block and the second xREG that occupies the second four resource elements in the physical resource block.

Example 41 includes the apparatus of example 31 or 40, wherein the one or more processors and memory are further configured to signal, by higher layers via a UE specific dedicated RRC signalling, a configuration of the xPDCCH transmission having one of the N xPDCCH sets including whether the one of the N xPDCCH sets is either localized or distributed.

Example 42 includes the apparatus of example 41, wherein the one or more processors and memory are further configured to define L extended control channel element (xCCE) as an aggregation level for one xPDCCH message, wherein L is a positive integer and a number of xPDCCH transmission candidates are dependent on the aggregation level.

Example 43 includes the apparatus of example 31, wherein the one or more processors and memory are further configured to partially overlap a first xPDCCH with a second xPDCCH, wherein the first xPDCCH is uses a localized mode and the second xPDCCH uses a distributed mode.

Example 44 includes the apparatus of example 31, wherein the one or more processors and memory are further configured to use one or more of a plurality of mapping configurations for mapping an extended resource element group (xREG) to an extended control channel element (xCCE) for two APs.

Example 45 includes the apparatus of example 31, wherein the one or more processors and memory are further configured to use one or more of the plurality of mapping configurations from an extended resource element group (xREG) to an extended control channel element (xCCE) for four APs.

Example 46 includes the apparatus of example 31, wherein the one or more processors and memory are further configured to use one or more of the plurality of mapping configurations from an extended control channel element (xCCE) to an xPDCCH candidate for two APs.

Example 47 includes the apparatus of example 31, wherein the one or more processors and memory are further configured to use one or more of the plurality of mapping configurations from an extended control channel element (xCCE) to the xPDCCH candidate for four APs.

Example 48 includes the apparatus of example 31, wherein the one or more processors and memory are further configured to combine L an extended control channel element (xCCE) in one or more antenna ports to enable the UE to perform blind decoding on the xPDCCH candidate having different aggregation levels, wherein L is a positive integer.

Example 49 includes the apparatus of example 31, wherein the one or more processors and memory are further configured to: define a starting position of an extended control channel element (xCCE) as a function of a Cell Radio Network Temporary Identifier (C-RNTI), a symbol, slot, subframe, or a frame index; define an AP association for one UE as a function of the C-RNTI; and/or fix the AP association for all UEs.

Example 50 includes an apparatus of a user equipment (UE), the UE configured to communicate with a eNodeB, the apparatus comprising one or more processors and memory configured to: process an orthogonal frequency-division multiplexing (OFDM) symbol, received from the eNodeB, that include reference signals, the OFDM symbol comprising a DeModulation Reference signal (DM-RS) for a first antenna port (AP) multiplexed in a physical resource block with a DM-RS for a second antenna port (AP); and process the OFDM symbol, received from the eNodeB using an extended physical downlink control channel (xPDCCH).

Example 51 includes the apparatus of example 50, wherein the one or more processors and memory are further configured to use two or more antenna ports (AP) for transmission of the xPDCCH, and wherein the DM-RS for the first AP and the DM-RS for the second AP are multiplexed using frequency-division multiplexing (FDM) or Code Division Multiplexing (CDM).

Example 52 includes the apparatus of example 51, wherein a first extended resource element group (xREG) is associated with the first AP and a second xREG is associated with the second AP, and each of the first xREG and the second xREG occupy four resource elements in the physical resource block, or wherein a first extended resource element group (xREG) occupies a first four resource elements in the physical resource block and a second xREG occupies a second four resource elements in the physical resource block, and wherein K contiguous extended resource element groups (xREGs) are used to form an extended control channel element (xCCE), wherein the UE is configured with up to N xPDCCH sets, wherein each xPDCCH set includes M physical resource block group (RBG) and each xPDCCH set is either localized or distributed, wherein K, M, and N are positive integers.

Example 53 includes the apparatus of example 50, wherein the one or more processors and memory are further configured to process a signal, received from the eNodeB using higher layers via a UE specific dedicated RRC signalling, indicating a configuration of the xPDCCH transmission having one of the N xPDCCH sets including whether the one of the N xPDCCH sets is either localized or distributed.

Example 54 includes the apparatus of example 50, wherein the one or more processors and memory are further configured to: process one or more of a plurality of mapping configurations from an extended resource element group (xREG) to extended control channel element (xCCE) for the first AP and the second AP; process one or more of the plurality of mapping configurations from the xREG to the xCCE for the first AP, the second AP, a third AP and a fourth AP; process one or more of the plurality of mapping configurations from the xCCE to an xPDCCH candidate for the first AP and the second AP; process one or more of the plurality of mapping configurations from the xCCE to the xPDCCH candidate for the first AP, the second AP, the third AP and the fourth AP; or perform blind decoding on the xPDCCH candidate having different aggregation levels.

Example 55 includes the apparatus of example 50, wherein the apparatus includes at least one of an antenna, a touch sensitive display screen, a speaker, a microphone, a graphics processor, an application processor, a baseband processor, an internal memory, a non-volatile memory port, and combinations thereof.

Example 56 includes at least one machine readable storage medium having instructions embodied thereon for an eNodeB to communicate with a User Equipment (UE), the instructions when executed cause the eNodeB to: process reference signals to form an OFDM symbol comprising a DeModulation Reference signal (DM-RS) for a first antenna port (AP) multiplexed in a physical resource block with a DM-RS for a second AP, and a DM-RS for a third AP multiplexed in the physical resource block with a DM-RS for a fourth AP; and process, for transmission to the UE, the OFDM symbol using an extended physical downlink control channel (xPDCCH).

Example 57 includes the at least one machine readable storage medium of example 56, wherein the DM-RS for the first AP, the DM-RS for the second AP, the DM-RS for the third AP, and the DM-RS for the fourth AP are multiplexed using frequency-division multiplexing (FDM) or Code Division Multiplexing (CDM).

Example 58 includes at least one machine readable storage medium of example 57, wherein a first extended resource element group (xREG) is associated with the first AP, a second xREG is associated with the second AP, a third xREG is associated with the third AP, and a fourth xREG is associated with the fourth AP, and each of the first xREG, the second xREG, the third xREG, and the fourth xREG occupy four resource elements in the physical resource block.

Example 59 includes at least one machine readable storage medium of example 56, wherein a first extended resource element group (xREG) occupies a first four resource elements in the physical resource block, a second xREG occupies a second four resource elements, a third xREG occupies a third four resource elements, and a fourth xREG occupies a fourth four resource elements in the physical resource block.

Example 60 includes at least one machine readable storage medium of example 56, wherein the one or more processors and memory are further configured to: use K contiguous extended resource element groups (xREGs) to form an extended control channel element (xCCE); use one or more of a plurality of mapping configurations from the xREG to the xCCE for the first AP and the second AP; use one or more of the plurality of mapping configurations from the xREG to the xCCE for the first AP, the second AP, a third AP and a fourth AP; wherein an xCCE index from an xREG in the xPDCCH set is defined as having two RBG for the first xREG associated with the first AP, the second xREG that is associated with the second AP, the third xREG that is associated with the third AP, and the fourth xREG that is associated with the fourth AP, or the xCCE index from the xREG in the xPDCCH set is defined as having four RBG for the first xREG associated with the first AP, the second xREG that is associated with the second AP, the third xREG that is associated with the third AP, and the fourth xREG that is associated with the fourth AP; use one or more of the plurality of mapping configurations from the xCCE to an xPDCCH candidate for the first AP, the second AP, the third AP, and the fourth AP; use one or more of the plurality of mapping configurations from the xCCE to the xPDCCH candidate for the first AP, the second AP, the third AP and the fourth AP; use K contiguous physical resource blocks (PRB) as one PRG group of the xPDCCH transmission, wherein the UE is configured with up to N xPDCCH sets, wherein each xPDCCH set includes M physical resource block groups (RBG) and each xPDCCH set is either localized or distributed, wherein K, M, and N are positive integer; and/or apply an orthogonal cover code (OCC) when multiplexing one or more DeModulation Reference signals (DM-RS) using the CDM between the first AP, the second AP, the third AP or the fourth AP.

Example 61 includes an apparatus of an eNodeB, the eNodeB configured to communicate with a User Equipment (UE), the apparatus comprising one or more processors and memory configured to: process reference signals to form an orthogonal frequency-division multiplexing (OFDM) symbol comprising a DeModulation Reference signal (DM-RS) for a first antenna port (AP) multiplexed in a physical resource block with a DM-RS for a second antenna port (AP); and process, for transmission to the UE, the OFDM symbol using an extended physical downlink control channel (xPDCCH).

Example 62 includes the apparatus of example 61, wherein the DM-RS for the first AP and the DM-RS for the second AP are multiplexed using frequency-division multiplexing (FDM) or Code Division Multiplexing (CDM), wherein an orthogonal cover code (OCC) is applied for the CDM to distinguish the first AP from the second AP, or wherein a first extended resource element group (xREG) is associated with the first AP and a second xREG is associated with the second AP, and each of the first xREG and the second xREG occupy four resource elements in the physical resource block.

Example 63 includes the apparatus of example 61 or 62, wherein a first extended resource element group (xREG) occupies a first four resource elements in the physical resource block and a second xREG occupies a second four resource elements in the physical resource block.

In Example 64, the subject matter of Example 61 or any of the Examples described herein may further include, wherein the one or more processors and memory are further configured to: use K contiguous extended resource element groups (xREGs) to form an extended control channel element (xCCE); group one or more xCCEs in consecutive resource block groups (RBGs) to form an xPDCCH candidate for localized transmission; or group one or more xCCEs in separate resource block groups (RBGs) to form an xPDCCH candidate for distributed transmission.

In Example 65, the subject matter of Example 61 or any of the Examples described herein may further include, wherein each one of the K contiguous xREGs include a first extended resource element group (xREG) that is associated with the first AP and a second xREG that is associated with the second AP, and each of the first xREG and the second xREG occupy four resource elements in a physical resource block, wherein the K xREGs indicate the xCCE has resource elements equal to the four resource elements multiplied by K of the K contiguous xREGs and occupies K physical resource blocks in a frequency domain, wherein K is a positive integer, or wherein each one of the K contiguous xREGs include a first extended resource element group (xREG) that occupies a first four resource elements in the physical resource block and a second xREG that occupies a second four resource elements in the physical resource block, wherein the K xREGs indicate the xCCE has resource elements equal to the first four and second four resource elements added together and multiplied by ½ K of the K contiguous xREGs and occupies K physical resource blocks in a frequency domain, wherein K is a positive integer.

In example 66, the subject matter of Example 61 or any of the Examples described herein may further include, wherein the UE is configured with up to N xPDCCH sets, wherein each xPDCCH set includes M physical resource block groups (RBG) and each xPDCCH set is either localized or distributed, wherein K, M, and N are positive integers.

In example 67, the subject matter of Example 61 or any of the Examples described herein may further include, wherein an xCCE index from an xREG in the xPDCCH set is defined as having two RBG for the first xREG associated with the first AP and the second xREG associated with the second AP, or the xCCE index from the xREG in the xPDCCH set is defined as having two RBG for the first xREG that occupies the first four resource elements in the physical resource block and the second xREG that occupies the second four resource elements in the physical resource block.

In example 68, the subject matter of Example 61 or any of the Examples described herein may further include, wherein the one or more processors and memory are further configured to: signal, by higher layers via a UE specific dedicated RRC signalling, a configuration of the xPDCCH transmission having one of the N xPDCCH sets including whether the one of the N xPDCCH sets is either localized or distributed; define L xCCE as an aggregation level for one xPDCCH message, wherein L is a positive integer and a number of xPDCCH transmission candidates are dependent on the aggregation level; partially overlap a first xPDCCH with a second xPDCCH, wherein the first xPDCCH is uses a localized mode and the second xPDCCH uses a distributed mode; use one or more of a plurality of mapping configurations for mapping the xREG to the xCCE for two APs; use one or more of the plurality of mapping configurations from the xREG to the xCCE for four APs; use one or more of the plurality of mapping configurations from the xCCE to an xPDCCH candidate for two APs; use one or more of the plurality of mapping configurations from the xCCE to the xPDCCH candidate for four APs; combine L xCCE in one or more antenna ports to enable the UE to perform blind decoding on the xPDCCH candidate having different aggregation levels, wherein L is a positive integer; define a starting position of xCCE as a function of a Cell Radio Network Temporary Identifier (C-RNTI), a symbol, slot, subframe, or a frame index; define an AP association for one UE as a function of the C-RNTI; or fix the AP association for all UEs.

Example 69 includes an apparatus of a user equipment (UE), the UE configured to communicate with a eNodeB, the apparatus comprising one or more processors and memory configured to: process an orthogonal frequency-division multiplexing (OFDM) symbol, received from the eNodeB, that include reference signals, the OFDM symbol comprising a DeModulation Reference signal (DM-RS) for a first antenna port (AP) multiplexed in a physical resource block with a DM-RS for a second antenna port (AP); and process the OFDM symbol, received from the eNodeB using an extended physical downlink control channel (xPDCCH).

Example 70 includes the apparatus of example 69, wherein the one or more processors and memory are further configured to use two or more antenna ports (AP) for transmission of the xPDCCH, and wherein the DM-RS for the first AP and the DM-RS for the second AP are multiplexed using frequency-division multiplexing (FDM) or Code Division Multiplexing (CDM), wherein a first extended resource element group (xREG) is associated with the first AP and a second xREG is associated with the second AP, and each of the first xREG and the second xREG occupy four resource elements in the physical resource block, or wherein a first extended resource element group (xREG) occupies a first four resource elements in the physical resource block and a second xREG occupies a second four resource elements in the physical resource block, or wherein K contiguous extended resource element groups (xREGs) are used to form an extended control channel element (xCCE), wherein the UE is configured with up to N xPDCCH sets, wherein each xPDCCH set includes M physical resource block group (RBG) and each xPDCCH set is either localized or distributed, wherein K, M, and N are positive integers.

Example 71 includes the apparatus of example 69 or 70, wherein the one or more processors and memory are further configured to: process a signal, received from the eNodeB using higher layers via a UE specific dedicated RRC signalling, indicating a configuration of the xPDCCH transmission having one of the N xPDCCH sets including whether the one of the N xPDCCH sets is either localized or distributed; process one or more of a plurality of mapping configurations from the xREG to the xCCE for the first AP and the second AP; process one or more of the plurality of mapping configurations from the xREG to the xCCE for the first AP, the second AP, a third AP and a fourth AP; process one or more of the plurality of mapping configurations from the xCCE to an xPDCCH candidate for the first AP and the second AP; process one or more of the plurality of mapping configurations from the xCCE to the xPDCCH candidate for the first AP, the second AP, the third AP and the fourth AP; or perform blind decoding on the xPDCCH candidate having different aggregation levels.

In example 72, the subject matter of Example 69 or any of the Examples described herein may further include, wherein the apparatus includes at least one of an antenna, a touch sensitive display screen, a speaker, a microphone, a graphics processor, an application processor, a baseband processor, an internal memory, a non-volatile memory port, and combinations thereof.

Example 73 includes at least one machine readable storage medium having instructions embodied thereon for an eNodeB to communicate with a User Equipment (UE), the instructions when executed cause the eNodeB to: process reference signals to form an OFDM symbol comprising a DeModulation Reference signal (DM-RS) for a first antenna port (AP) multiplexed in a physical resource block with a DM-RS for a second AP, and a DM-RS for a third AP multiplexed in the physical resource block with a DM-RS for a fourth AP; and process, for transmission to the UE, the OFDM symbol using an extended physical downlink control channel (xPDCCH).

Example 74 includes at least one machine readable storage medium of example 73, wherein the DM-RS for the first AP, the DM-RS for the second AP, the DM-RS for the third AP, and the DM-RS for the fourth AP are multiplexed using frequency-division multiplexing (FDM) or Code Division Multiplexing (CDM), wherein a first extended resource element group (xREG) is associated with the first AP, a second xREG is associated with the second AP, a third xREG is associated with the third AP, and a fourth xREG is associated with the fourth AP, and each of the first xREG, the second xREG, the third xREG, and the fourth xREG occupy four resource elements in the physical resource block, or wherein a first extended resource element group (xREG) occupies a first four resource elements in the physical resource block, a second xREG occupies a second four resource elements, a third xREG occupies a third four resource elements, and a fourth xREG occupies a fourth four resource elements in the physical resource block.

Example 75 includes at least one machine readable storage medium of example 73 or 74, wherein the one or more processors and memory are further configured to: use K contiguous extended resource element groups (xREGs) to form an extended control channel element (xCCE); use one or more of a plurality of mapping configurations from the xREG to the xCCE for the first AP and the second AP; use one or more of the plurality of mapping configurations from the xREG to the xCCE for the first AP, the second AP, a third AP and a fourth AP; wherein an xCCE index from an xREG in the xPDCCH set is defined as having two RBG for the first xREG associated with the first AP, the second xREG that is associated with the second AP, the third xREG that is associated with the third AP, and the fourth xREG that is associated with the fourth AP, or the xCCE index from the xREG in the xPDCCH set is defined as having four RBG for the first xREG associated with the first AP, the second xREG that is associated with the second AP, the third xREG that is associated with the third AP, and the fourth xREG that is associated with the fourth AP; use one or more of the plurality of mapping configurations from the xCCE to an xPDCCH candidate for the first AP, the second AP, the third AP, and the fourth AP; use one or more of the plurality of mapping configurations from the xCCE to the xPDCCH candidate for the first AP, the second AP, the third AP and the fourth AP; use K contiguous physical resource blocks (PRB) as one PRG group of the xPDCCH transmission, wherein the UE is configured with up to N xPDCCH sets, wherein each xPDCCH set includes M physical resource block groups (RBG) and each xPDCCH set is either localized or distributed, wherein K, M, and N are positive integer; and/or apply an orthogonal cover code (OCC) when multiplexing one or more DeModulation Reference signals (DM-RS) using the CDM between the first AP, the second AP, the third AP or the fourth AP.

Example 76 includes a device for an eNodeB to communicate with a User Equipment (UE), the device comprising: means for processing reference signals to form an OFDM symbol comprising a DeModulation Reference signal (DM-RS) for a first antenna port (AP) multiplexed in a physical resource block with a DM-RS for a second AP, and a DM-RS for a third AP multiplexed in the physical resource block with a DM-RS for a fourth AP; and means for processing, for transmission to the UE, the OFDM symbol using an extended physical downlink control channel (xPDCCH).

Example 77 includes the device of example 76, wherein the DM-RS for the first AP, the DM-RS for the second AP, the DM-RS for the third AP, and the DM-RS for the fourth AP are multiplexed using frequency-division multiplexing (FDM) or Code Division Multiplexing (CDM).

Example 78 includes the device of example 77, wherein a first extended resource element group (xREG) is associated with the first AP, a second xREG is associated with the second AP, a third xREG is associated with the third AP, and a fourth xREG is associated with the fourth AP, and each of the first xREG, the second xREG, the third xREG, and the fourth xREG occupy four resource elements in the physical resource block.

Example 79 includes the device of example 77, wherein a first extended resource element group (xREG) occupies a first four resource elements in the physical resource block, a second xREG occupies a second four resource elements, a third xREG occupies a third four resource elements, and a fourth xREG occupies a fourth four resource elements in the physical resource block.

Example 80 includes the device of example 77, further comprising means for: using K contiguous extended resource element groups (xREGs) to form an extended control channel element (xCCE); using one or more of a plurality of mapping configurations from the xREG to the xCCE for the first AP and the second AP; using one or more of the plurality of mapping configurations from the xREG to the xCCE for the first AP, the second AP, a third AP and a fourth AP; wherein an xCCE index from an xREG in the xPDCCH set is defined as having two RBG for the first xREG associated with the first AP, the second xREG that is associated with the second AP, the third xREG that is associated with the third AP, and the fourth xREG that is associated with the fourth AP, or the xCCE index from the xREG in the xPDCCH set is defined as having four RBG for the first xREG associated with the first AP, the second xREG that is associated with the second AP, the third xREG that is associated with the third AP, and the fourth xREG that is associated with the fourth AP; using one or more of the plurality of mapping configurations from the xCCE to an xPDCCH candidate for the first AP, the second AP, the third AP, and the fourth AP; using one or more of the plurality of mapping configurations from the xCCE to the xPDCCH candidate for the first AP, the second AP, the third AP and the fourth AP; using K contiguous physical resource blocks (PRB) as one PRG group of the xPDCCH transmission, wherein the UE is configured with up to N xPDCCH sets, wherein each xPDCCH set includes M physical resource block groups (RBG) and each xPDCCH set is either localized or distributed, wherein K, M, and N are positive integer; and/or applying an orthogonal cover code (OCC) when multiplexing one or more DeModulation Reference signals (DM-RS) using the CDM between the first AP, the second AP, the third AP or the fourth AP.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of an eNodeB, the eNodeB configured to communicate with a User Equipment (UE), the apparatus comprising one or more processors and memory configured to:
   process reference signals to form an orthogonal frequency-division multiplexing (OFDM) symbol comprising a DeModulation Reference signal (DM-RS) for a first antenna port (AP) multiplexed in a physical resource block with a DM-RS for a second antenna port (AP);
   process, for transmission to the UE, the OFDM symbol using an extended physical downlink control channel (xPDCCH); and
   use one or more of a plurality of mapping configurations from an extended control channel element (xCCE) to an xPDCCH candidate for four APs.

2. The apparatus of claim 1, wherein the DM-RS for the first AP and the DM-RS for the second AP are multiplexed using frequency-division multiplexing (FDM) or Code Division Multiplexing (CDM), wherein an orthogonal cover code (OCC) is applied for the CDM to distinguish the first AP from the second AP.

3. The apparatus of claim 2, wherein a first extended resource element group (xREG) is associated with the first AP and a second xREG is associated with the second AP, and each of the first xREG and the second xREG occupy four resource elements in the physical resource block.

4. The apparatus of claim 1, wherein a first extended resource element group (xREG) occupies a first four resource elements in the physical resource block and a second xREG occupies a second four resource elements in the physical resource block.

5. The apparatus of claim 1, wherein the one or more processors and memory are further configured to use K contiguous extended resource element groups (xREGs) to form the xCCE.

6. The apparatus of claim 1, wherein the one or more processors and memory are further configured to:
   map one or more extended resource element groups (xREGs) to one or more xCCE with two antenna ports (AP) or four antenna ports (AP) according to at least one of:
   a) an xREG to xCCE mapping table for at least two resource block groups (RBGs) using two antenna ports according to:

| RBG index | xREG → xCCE | |
|---|---|---|
| 0 | 0 → 0 | 1 → 1 |
| 1 | 0 → 2 | 1 → 3; | b) an xREG to xCCE mapping table for at least four resource block groups (RBGs) using two antenna ports according to:

| RBG index | xREG → xCCE | |
|---|---|---|
| 0 | 0 → 0 | 1 → 1 |
| 1 | 0 → 2 | 1 → 3 |
| 2 | 0 → 4 | 1 → 5 |
| 3 | 0 → 6 | 1 → 7; | c) an xREG to xCCE mapping table for at least two resource block groups (RBGs) using four antenna ports according to:

| RBG index | xREG → xCCE | | | |
|---|---|---|---|---|
| 0 | 0 → 0 | 1 → 1 | 2 → 4 | 3 → 5 |
| 1 | 0 → 2 | 1 → 3 | 2 → 6 | 3 → 7; | or d) an xREG to xCCE mapping table for at least four resource block groups (RGBs) using four antenna ports according to:

| RBG index | xREG → xCCE | | | |
|---|---|---|---|---|
| 0 | 0 → 0 | 1 → 1 | 2 → 8 | 3 → 9 |
| 1 | 0 → 2 | 1 → 3 | 2 → 10 | 3 → 11 |
| 2 | 0 → 4 | 1 → 5 | 2 → 12 | 3 → 13 |
| 3 | 0 → 6 | 1 → 7 | 2 → 14 | 3 → 15; | or map one or more extended resource element groups (xREGs) to one or more extended control channel element (xCCE) with two antenna ports (AP) or four antenna ports (AP) according to at least one of:

e) an xREG to xCCE mapping table for at least two resource block groups (RGBs) using two antenna ports according to:

| RBG index | xREG → xCCE |
|---|---|
| 0 | 0 → 0 |
| 1 | 0 → 1; | f) an xREG to xCCE mapping table for at least four resource block groups (RGBs) using two antenna ports according to:

| RBG index | xREG → xCCE |
|---|---|
| 0 | 0 → 0 |
| 1 | 0 → 1 |
| 2 | 0 → 2 |
| 3 | 0 → 3; | g) an xREG to xCCE mapping table for at least two resource block groups (RGBs) using four antenna ports according to:

| RBG index | xREG → xCCE | |
|---|---|---|
| 0 | 0 → 0 | 1 → 1 |
| 1 | 0 → 2 | 1 → 3; | or h) an xREG to xCCE mapping table for at least four resource block groups (RGBs) using four antenna ports according to:

| RBG index | xREG → xCCE | |
|---|---|---|
| 0 | 0 → 0 | 1 → 1 |
| 1 | 0 → 2 | 1 → 3 |
| 2 | 0 → 4 | 1 → 5 |
| 3 | 0 → 6 | 1 → 7. |

7. The apparatus of claim 1, wherein each one of K contiguous extended resource element groups (xREGs) include a first extended resource element group (xREG) that is associated with the first AP and a second xREG that is associated with the second AP, and each of the first xREG and the second xREG occupy four resource elements in a physical resource block, wherein the K xREGs indicate the xCCE has resource elements equal to the four resource elements multiplied by K of the K contiguous xREGs and occupies K physical resource blocks in a frequency domain, wherein K is a positive integer.

8. The apparatus of claim 1, wherein each one of K contiguous extended resource element groups (xREGs) include a first extended resource element group (xREG) that occupies a first four resource elements in the physical resource block and a second xREG that occupies a second four resource elements in the physical resource block, wherein the K xREGs indicate the xCCE has resource elements equal to the first four and second four resource elements added together and multiplied by ½ K of the K contiguous xREGs and occupies K physical resource blocks in a frequency domain, wherein K is a positive integer.

9. The apparatus of claim 1, wherein the UE is configured with up to N xPDCCH sets, wherein each xPDCCH set includes M physical resource block groups (RBGs) and each xPDCCH set is either localized or distributed, wherein K, M, and N are positive integers.

10. The apparatus of claim 1, wherein an xCCE index from an extended resource element group (xREG) in the xPDCCH set is defined as having two physical resource block groups (RBGs) for the first xREG associated with the first AP and the second xREG associated with the second AP, or the xCCE index from the xREG in the xPDCCH set is defined as having two RBGs for the first xREG that occupies the first four resource elements in the physical resource block and the second xREG that occupies the second four resource elements in the physical resource block.

11. The apparatus of claim 1, wherein the one or more processors and memory are further configured to signal, by higher layers via a UE specific dedicated RRC signalling, a configuration of the xPDCCH transmission having one of N xPDCCH sets including whether the one of N xPDCCH sets is either localized or distributed.

12. The apparatus of claim 11, wherein the one or more processors and memory are further configured to define L extended control channel element (xCCE) as an aggregation level for one xPDCCH message, wherein L is a positive integer and a number of xPDCCH transmission candidates are dependent on the aggregation level.

13. The apparatus of claim 1, wherein the one or more processors and memory are further configured to partially overlap a first xPDCCH with a second xPDCCH, wherein the first xPDCCH is uses a localized mode and the second xPDCCH uses a distributed mode.

14. The apparatus of claim 1, wherein the one or more processors and memory are further configured to use one or more of the plurality of mapping configurations for mapping an extended resource element group (xREG) to an xCCE for two APs.

15. The apparatus of claim 1, wherein the one or more processors and memory are further configured to combine L xCCEs in one or more antenna ports to enable the UE to perform blind decoding on the xPDCCH candidate having different aggregation levels, wherein L is a positive integer.

16. The apparatus of claim 1, wherein the one or more processors and memory are further configured to:

define a starting position of the xCCE as a function of a Cell Radio Network Temporary Identifier (C-RNTI), a symbol, slot, subframe, or a frame index;

define an AP association for one UE as a function of the C-RNTI; or fix the AP association for all UEs.

17. An apparatus of a user equipment (UE), the UE configured to communicate with an eNodeB, the apparatus comprising one or more processors and memory configured to:

process an orthogonal frequency-division multiplexing (OFDM) symbol, received from the eNodeB, that include reference signals, the OFDM symbol comprising a DeModulation Reference signal (DM-RS) for a first antenna port (AP) multiplexed in a physical resource block with a DM-RS for a second antenna port (AP);

process the OFDM symbol, received from the eNodeB using an extended physical downlink control channel (xPDCCH); and use two or more APs for transmission of the xPDCCH, wherein the DM-RS for the first AP and the DM-RS for the second AP are multiplexed using frequency-division multiplexing (FDM) or Code Division Multiplexing (CDM), and wherein a first extended resource element group (xREG) is associated with the first AP and a second xREG is associated with the second AP, and each of the first xREG and the second xREG occupy four resource elements in the physical resource block, or wherein a first extended resource element group (xREG) occupies a first four resource elements in the physical resource block and a second xREG occupies a second four resource elements in the physical resource block, and wherein K contiguous extended resource element groups (xREGs) are used to form an extended control channel element (xCCE), wherein the UE is configured with up to N xPDCCH sets, wherein each xPDCCH set includes M physical resource block groups (RBGs) and each xPDCCH set is either localized or distributed, wherein K, M, and N are positive integers.

18. The apparatus of claim 17, wherein the one or more processors and memory are further configured to process a signal, received from the eNodeB using higher layers via a UE specific dedicated RRC signalling, indicating a configuration of the xPDCCH transmission having one of the N xPDCCH sets including whether the one of the N xPDCCH sets is either localized or distributed.

19. The apparatus of claim 17, wherein the one or more processors and memory are further configured to:

process one or more of a plurality of mapping configurations from an xREG to an xCCE for the first AP and the second AP;

process one or more of the plurality of mapping configurations from the xREG to the xCCE for the first AP, the second AP, a third AP and a fourth AP;

process one or more of the plurality of mapping configurations from the xCCE to an xPDCCH candidate for the first AP and the second AP;

process one or more of the plurality of mapping configurations from the xCCE to the xPDCCH candidate for the first AP, the second AP, the third AP and the fourth AP; or perform blind decoding on the xPDCCH candidate having different aggregation levels.

20. The apparatus of claim 17, wherein the apparatus includes at least one of an antenna, a touch sensitive display screen, a speaker, a microphone, a graphics processor, an application processor, a baseband processor, an internal memory, a non-volatile memory port, and combinations thereof.

21. At least one non-transitory machine readable storage medium having instructions embodied thereon for an eNodeB to communicate with a User Equipment (UE), the instructions when executed cause the eNodeB to:

process reference signals to form an OFDM symbol comprising a DeModulation Reference signal (DM-RS) for a first antenna port (AP) multiplexed in a physical resource block with a DM-RS for a second AP, and a DM-RS for a third AP multiplexed in the physical resource block with a DM-RS for a fourth AP;

process, for transmission to the UE, the OFDM symbol using an extended physical downlink control channel (xPDCCH);

signal, by higher layers via a UE specific dedicated RRC signalling, a configuration of the xPDCCH transmission having one of N xPDCCH sets including whether the one of N xPDCCH sets is either localized or distributed; and define L extended control channel element (xCCE) as an aggregation level for one xPDCCH message, wherein L is a positive integer and a number of xPDCCH transmission candidates are dependent on the aggregation level.

22. The at least one non-transitory machine readable storage medium of claim 21, wherein the DM-RS for the first AP, the DM-RS for the second AP, the DM-RS for the third AP, and the DM-RS for the fourth AP are multiplexed using frequency-division multiplexing (FDM) or Code Division Multiplexing (CDM).

23. The at least one non-transitory machine readable storage medium of claim 22, wherein a first extended resource element group (xREG) is associated with the first AP, a second xREG is associated with the second AP, a third xREG is associated with the third AP, and a fourth xREG is associated with the fourth AP, and each of the first xREG, the second xREG, the third xREG, and the fourth xREG occupy four resource elements in the physical resource block.

24. The at least one non-transitory machine readable storage medium of claim 21, wherein a first extended resource element group (xREG) occupies a first four resource elements in the physical resource block, a second xREG occupies a second four resource elements, a third xREG occupies a third four resource elements, and a fourth xREG occupies a fourth four resource elements in the physical resource block.

25. The at least one non-transitory machine readable storage medium of claim 21, wherein the one or more processors and memory are further configured to:

use K contiguous extended resource element groups (xREGs) to form an xCCE;

use one or more of a plurality of mapping configurations from the xREG to the xCCE for the first AP and the second AP;

use one or more of the plurality of mapping configurations from the xREG to the xCCE for the first AP, the second AP, a third AP and a fourth AP; wherein an xCCE index from an xREG in the xPDCCH set is defined as having two resource block groups (RBGs) for the first xREG associated with the first AP, the second xREG that is associated with the second AP, the third xREG that is associated with the third AP, and the fourth xREG that is associated with the fourth AP, or the xCCE index from the xREG in the xPDCCH set is defined as having four RBGs for the first xREG associated with the first AP, the second xREG that is associated with the second AP, the third xREG that is associated with the third AP, and the fourth xREG that is associated with the fourth AP;

use one or more of the plurality of mapping configurations from the xCCE to an xPDCCH candidate for the first AP, the second AP, the third AP, and the fourth AP;

use one or more of the plurality of mapping configurations from the xCCE to the xPDCCH candidate for the first AP, the second AP, the third AP and the fourth AP;

use K contiguous physical resource blocks (PRB) as one PRG group of the xPDCCH transmission, wherein the UE is configured with up to N xPDCCH sets, wherein each xPDCCH set includes M RBGs and each xPDCCH set is either localized or distributed, wherein K, M, and N are positive integers; or apply an orthogonal cover code (OCC) when multiplexing one or more DeModulation Reference signals (DM-RS) using the CDM between the first AP, the second AP, the third AP or the fourth AP.

\* \* \* \* \*